(12) United States Patent
Harp

(10) Patent No.: US 10,369,524 B2
(45) Date of Patent: Aug. 6, 2019

(54) AUTOGENOUS CLEANING FILTRATION METHOD AND DEVICE

(71) Applicant: W. L. Gore & Associates, Inc., Newark, DE (US)

(72) Inventor: Gary P. Harp, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 14/589,068

(22) Filed: Jan. 5, 2015

(65) Prior Publication Data

US 2015/0190754 A1 Jul. 9, 2015

Related U.S. Application Data

(60) Provisional application No. 61/923,977, filed on Jan. 6, 2014.

(51) Int. Cl.
| | |
|---|---|
| *B01D 65/02* | (2006.01) |
| *B01D 63/16* | (2006.01) |
| *B01D 71/36* | (2006.01) |
| *F04B 43/06* | (2006.01) |
| *B01D 65/08* | (2006.01) |
| *B01D 69/10* | (2006.01) |
| *F04B 53/20* | (2006.01) |

(52) U.S. Cl.
CPC ............ *B01D 65/02* (2013.01); *B01D 63/16* (2013.01); *B01D 65/08* (2013.01); *B01D 69/10* (2013.01); *B01D 71/36* (2013.01); *F04B 43/06* (2013.01); *F04B 53/20* (2013.01); *B01D 2201/184* (2013.01); *B01D 2313/243* (2013.01); *B01D 2315/04* (2013.01); *B01D 2321/2058* (2013.01); *B01D 2321/30* (2013.01)

(58) Field of Classification Search
CPC ............................ B01D 2315/04; B01D 71/36
See application file for complete search history.

(56) References Cited

U.S. PATENT DOCUMENTS

| | | |
|---|---|---|
| 3,970,564 A | 7/1976 | Shamsutdinov et al. |
| 4,253,962 A | 3/1981 | Thompson |
| 4,452,616 A | 6/1984 | Gillingham et al. |
| (Continued) | | |

FOREIGN PATENT DOCUMENTS

| | | |
|---|---|---|
| CN | 10329853 A | 9/2013 |
| DE | 2122339 | 1/1972 |
| (Continued) | | |

OTHER PUBLICATIONS

DE19921269A1—EPO Machine Translation, 2017, 13 pages.*

*Primary Examiner* — Patrick J Orme
(74) *Attorney, Agent, or Firm* — Greenberg Traurig, LLP

(57) ABSTRACT

The present invention provides an apparatus including: a filter medium having a slack state and a ballooned state and an elastic support attached to the filter medium to define a contiguous fluid flow path through the filter medium and the support. The elastic support is adapted to displace the filter medium repeatedly between the slack state and the ballooned state; the ballooned state is out-of-plane with respect to the slack state; and the slack state of the filter medium provides for areal strain greater than about 10% of the ballooned state. A method of cleaning a filter medium in a flow path of a fluid containing a suspended component is also described.

20 Claims, 23 Drawing Sheets

(56) References Cited

U.S. PATENT DOCUMENTS

| | | |
|---|---|---|
| 4,526,688 A | 7/1985 | Schmidt, Jr. et al. |
| 4,545,969 A | 10/1985 | Diekotter et al. |
| 4,826,607 A | 5/1989 | Pearce |
| 4,952,317 A | 8/1990 | Culkin |
| 5,529,830 A | 6/1996 | Dutta et al. |
| 5,928,414 A * | 7/1999 | Wnenchak ......... B01D 39/1692 55/302 |
| 5,985,160 A * | 11/1999 | DiLeo ................... B01D 63/16 210/388 |
| 2005/0023207 A1 | 2/2005 | Kirker et al. |
| 2010/0314308 A1 | 12/2010 | Pflueger et al. |
| 2012/0324842 A1 | 12/2012 | Schumann et al. |
| 2013/0270165 A1 | 10/2013 | Shevitz |

FOREIGN PATENT DOCUMENTS

| | | | |
|---|---|---|---|
| DE | 19921269 | 6/2000 | |
| DE | 19921269 A1 * | 6/2000 | ........... B01D 25/164 |
| EP | 1767258 * | 3/2007 | ............. B01D 29/72 |
| GB | 996945 | 6/1965 | |
| JP | S51-033360 A | 3/1976 | |
| JP | H63-278505 A | 11/1988 | |
| JP | H02-75332 A | 3/1990 | |
| JP | H1066843 | 3/1998 | |
| JP | H11-57365 A | 3/1999 | |
| JP | H11-170054 A | 6/1999 | |
| JP | 2003-28766 A | 1/2003 | |
| JP | 2009-129557 A | 6/2009 | |
| JP | 2013-230438 A | 11/2013 | |
| WO | WO86/05413 | 9/1986 | |
| WO | WO03/008076 | 1/2003 | |

* cited by examiner

Top View Cross Section
Slack State

Side View

Balooned State

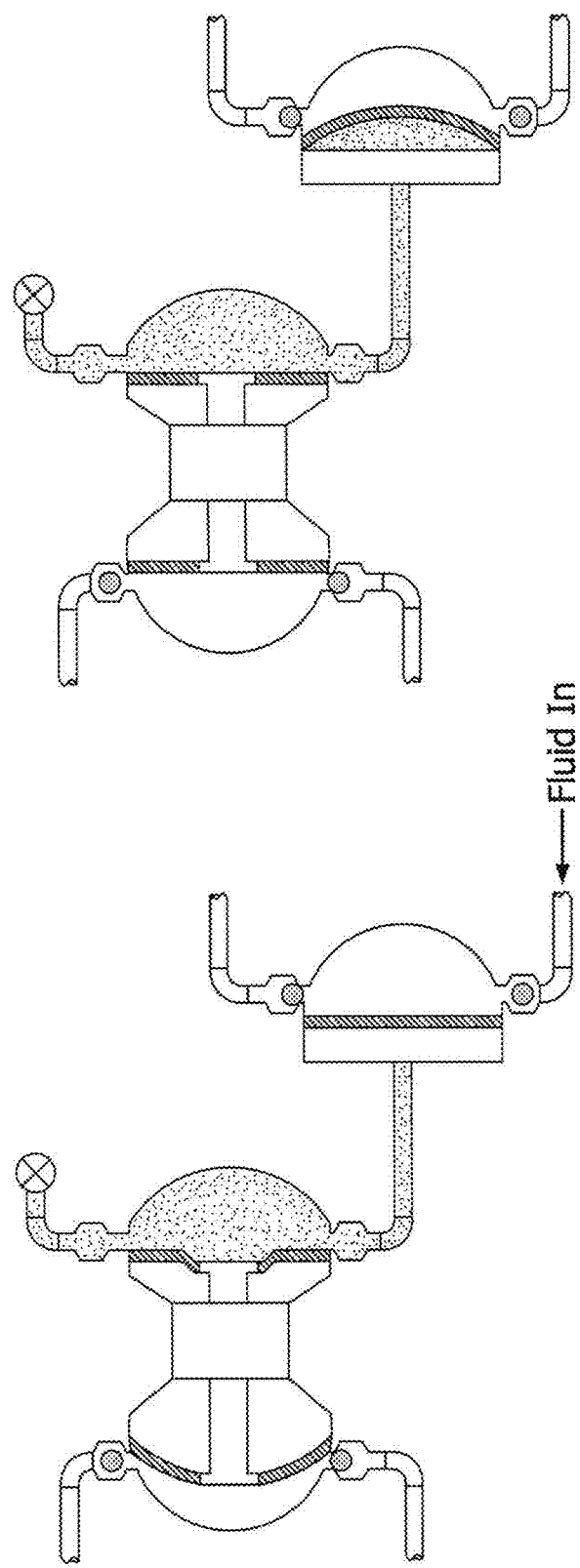

AUTOGENOUS CLEANING FILTRATION METHOD AND DEVICE

FIELD OF THE INVENTION

The present invention relates to filters, and more particularly, to a novel device and method for separating solids from fluid streams or colloidal suspensions.

BACKGROUND OF THE INVENTION

The present invention relates to a novel device and method for separating solids from fluid streams or colloidal suspensions. As used herein, "fluid" includes both liquid and gas. A permeable filter medium comprised of passages and openings is used to separate solids from the fluid portion of the colloidal solutions or suspensions in a process known as filtration. A variety of sizes and types of solids are of interest in these separations, ranging in size from a few nanometers, to hundreds of microns and ranging in nature from soft organic solids such as proteins to hard inorganic solids like silica particles. Nano-filters, ultrafilters, microfilters, and macrofilters are examples of permeable media suitable for filtration of particles of a variety of sizes. These filter media, can be comprised of nonwovens, wovens, or perforated screens or meshes produced by known methods in the art including, but not limited to fiber spinning, stretching, wetlaying, phase inversion, entangling fibers lithography, weaving, particle sintering or coalescence.

Although filtration has been employed to separate solids from fluids for many years, an ever present problem of plugging or fouling of the filter remains. Methods of enhancing fluid flow rates in the presence of solids can be found in the prior art. These include: the shearing of liquid slurry across the filter in tangential flow i.e. crossflow filtration, and/or the generation of shear by vibrating the membrane as described in U.S. Pat. No. 4,952,317. Such methods use a pump to force the feed slurry to flow tangentially to the filter, or a mechanical motion of the membrane to generate shear at the membrane surface. The resulting sheer can sometimes cause the concentrated solids to be removed from the face of the filter increasing the rate of fluid flow through the filter. Unfortunately, the provision of pumps or application of mechanical motion to the membrane can require expensive and bulky equipment and require expensive hard plumbing rated to high pressure or capable of withstanding vibrational or mechanical fatigue.

U.S. Pat. No. 4,253,962 proposes the use of sonic vibration, created by ultrasonic transducers, to produce cavitation at the face of the membrane. U.S. Pat. No. 4,526,688 proposes a shock-type system where the support and filter apparatus are mechanically impacted to remove the solids from the filter. U.S. Pat. No. 4,545,969 oscillates a shear plate parallel to a fixed filter surface. Further, U.S. Pat. No. 3,970,564 teaches a system where hard mounted filters are mechanically vibrated normal to their surface. U.S. Pat. No. 5,985,160 demonstrates a device where a solid plate is vibrated up and down near the surface of a filter to improve fluid flow in the presence of solids.

The techniques of cross-flow microfiltration, ultrafiltration, and nanofiltration are generally limited to low shear rates under $\sim 20,000$ s$^{-1}$. Achieving higher shear rates requires specialized equipment such as that described for example in U.S. Pat. No. 4,952,317 or 5,985,160 and can be difficult to practically achieve. Furthermore such techniques focus primarily on solids removal via driving motion tangent to the filter surface or by vibrating the surface in place.

Alternately, U.S. Pat. No. 5,928,414 and references therein teach back pulse techniques wherein the flow direction is reversed to break up a filter cake which slowly accumulates overtime. While these techniques can be effective, they require flow reversal or shut down of forward flow both of which have significant drawbacks in lost operating time, inefficient back flow of valuable filtered fluid, and high energy costs.

A filtration device which is able to autogenously dislodge accumulated solids from the face of the filter surface while maintaining a continuous flow through the filter without a need for tangent flow, vibration, or flow reversal would be a useful advance in the art of filtration and separation.

As used herein, "autogenous cleaning" means self-cleaning during use.

The applicants have discovered a filtration method in which solids are dislodged and ejected from the filter surface without interruption to forward flow via switching an elastically supported filter sheet between a slack and ballooned state during filtration. To enable transition from the aforementioned slack state to the ballooned state, the filter medium must must obey the relation $T_{medium} > E_{support}(A_{ballooned}/A_{slack})$. Here $T_{medium}$=Tensile Strength of the sheet, $E_{support}$=Elastic Modulus of the support, $A_{ballooned}$=the geometric area of medium surface in the ballooned state, and $A_{slack}$=the geometric area of the filter medium in the slack state. In addition, the applicants have discovered that increasing the frequency of transition from slack to ballooned states, and increasing the ratio of area ballooned/area slack improves the fluid flow through the filter during filtration.

SUMMARY OF THE INVENTION

In a first aspect, the invention provides a method of autogenous cleaning of a filter medium in a flow path of a fluid containing a suspended component, wherein the flow path of the fluid is from a high pressure side of the filter medium to a low pressure side of the filter medium, the method including the steps of (a) providing a filter medium having a first slack state and a second ballooned state; (b) disposing the filter medium in the flow path of the fluid to separate the suspended component from the fluid; and (c) repeatedly displacing the medium between the first slack state and the second ballooned state to discharge the suspended component from the medium while allowing the fluid to flow continuously through the medium from the high pressure side to the low pressure side. In alternative embodiments, the medium is one of nanofibrous, woven, nonwoven, or a membrane. Preferably, the membrane is expanded polytetrafluoroethylene ("ePTFE"). Also preferably, the second ballooned state is out-of-plane with respect to the first slack state.

In another embodiment, the inventive method includes the steps of coupling the medium to an elastic support and repeatedly displacing the elastic support in order to repeatedly displace the medium between the first slack state and the second ballooned state. In a preferred embodiment, the medium is displaced between the first slack state and the second ballooned state one hundred to three hundred times per minute. In alternative embodiments, the medium is one of substantially planar in shape and substantially tubular in shape. Also alternatively, the medium is asymmetric.

In another aspect, the invention provides an apparatus having (a) a filter medium having a first slack state and a second ballooned state; (b) an elastic support attached to the medium to define a contiguous fluid flow path through the membrane and the support; and (c) the elastic support adapted to displace the medium repeatedly between the first slack state and the second ballooned state, wherein the second ballooned state is out-of-plane with respect to the first slack state. Preferably, the slack state of the medium provides for areal strain greater than about 10% the ballooned state.

The present invention thus provides a device for separating solids from a fluid stream including solids in the form of colloidal solution or suspension utilizing a permeable medium comprised of passages or openings connecting the upstream (high pressure) and downstream (low pressure) faces of the sheet, an elastic support, a sealed enclosure separating the solids of the colloidal suspension from the clarified fluid filtered through the device, and a port or other means to allow transfer or collection of filtered fluid under the motivation of a simultaneously applied positive pressure to the upstream face of the sheet or negative pressure to the downstream enclosure. The medium is affixed to the elastic support in a ballooned state at one or several discrete locations so as to allow transfer of fluid through the medium while keeping solids outside the seal. The invention also pertains to a method of filtration using the above device to provide autogenous cleaning by alternating the elastic support between a ballooned and slack state during the course of filtration so as to discharge accumulated solids from the surface of the medium.

BRIEF DESCRIPTION OF THE DRAWINGS

FIG. 14b is a side cross-sectional view of the alternative embodiment of FIG. 14a.

FIGS. 19a-c are schematic side views of the embodiment of FIG. 18 as the double diaphragm pump moves through a displacement cycle.

DETAILED DESCRIPTION OF THE INVENTION

The invention includes a novel device and method for separating solids from colloidal suspensions. The invention includes the device, composition of the device, and the method(s) of use for said device to separate solids from fluid streams or colloidal suspensions in articles and applications of commerce.

The novel device utilizes a permeable filter medium comprised of passages or openings connecting the up and downstream faces of the sheet, an elastic support, a sealed enclosure separating the solids of the colloidal suspension from the clarified fluid filtered through the device, and a port or other means to allow transfer or collection of filtered fluid under the motivation of a simultaneously applied positive pressure to upstream face of the sheet or negative pressure to downstream enclosure. The sheet is affixed to the elastic support in a ballooned state at one or several discrete locations so as to allow transfer of fluid through the sheet while keeping solids outside the seal. The invention also pertains to a method of filtration using the above device to provide autogenous cleaning by alternating the elastic support between a ballooned and slack state during the course of filtration so as to discharge accumulated solids from the surface of the sheet.

Figure 3:
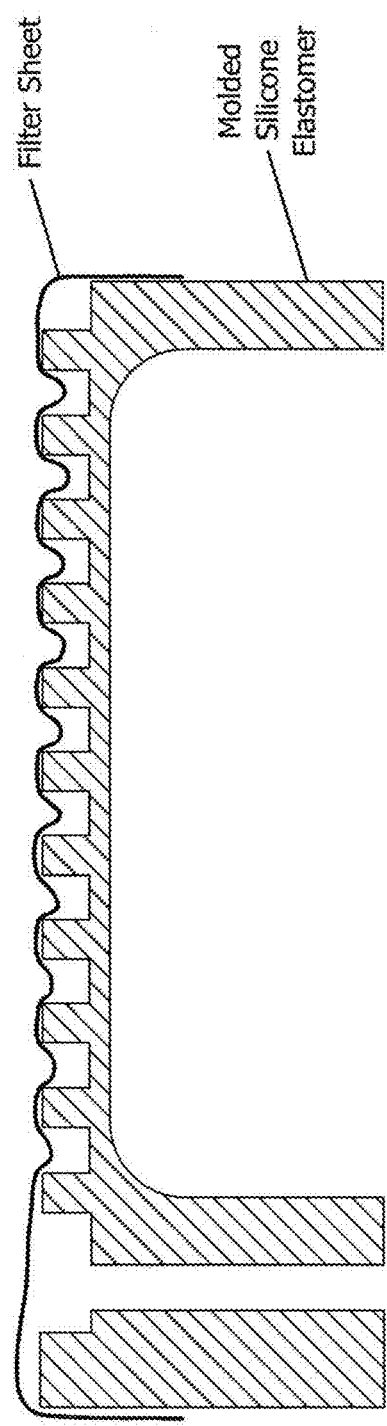
FIG. 3 is a side perspective illustrating the first exemplary embodiment of the filter medium of FIG. 1 in a slack state employed.
Figure 4:
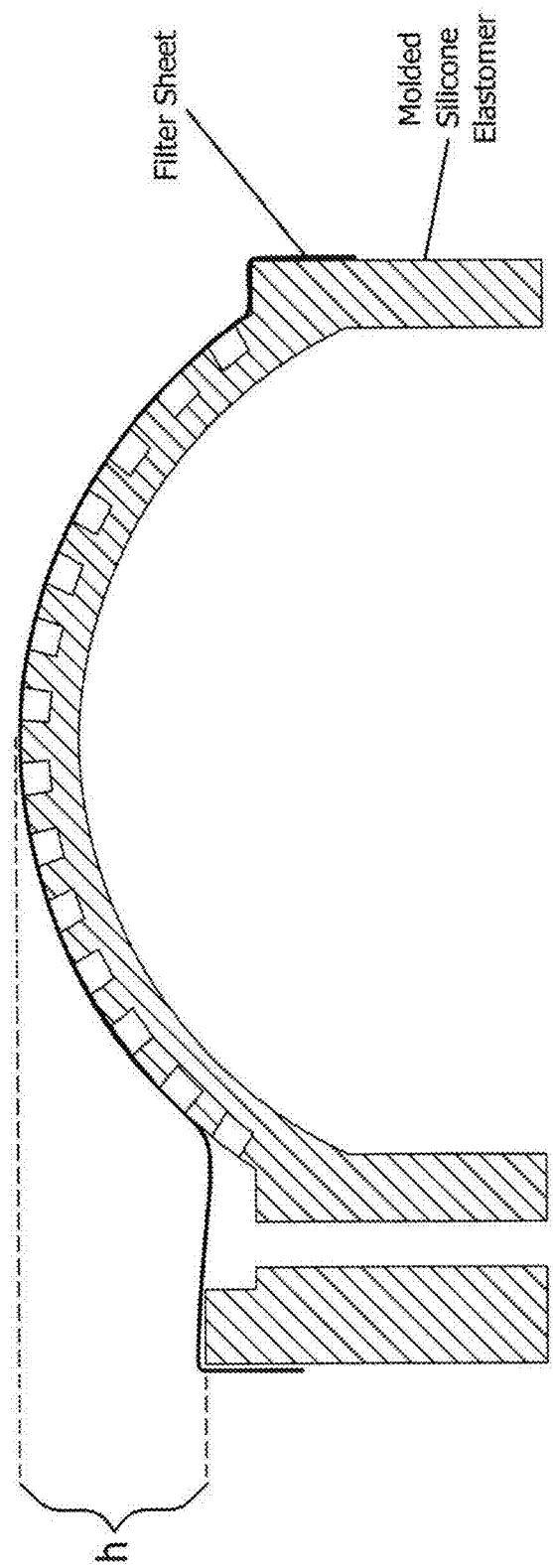
FIG. 4 is a side sectional view of the exemplary embodiment of the filter medium of FIG. 1 in a ballooned state.
Figure 5:
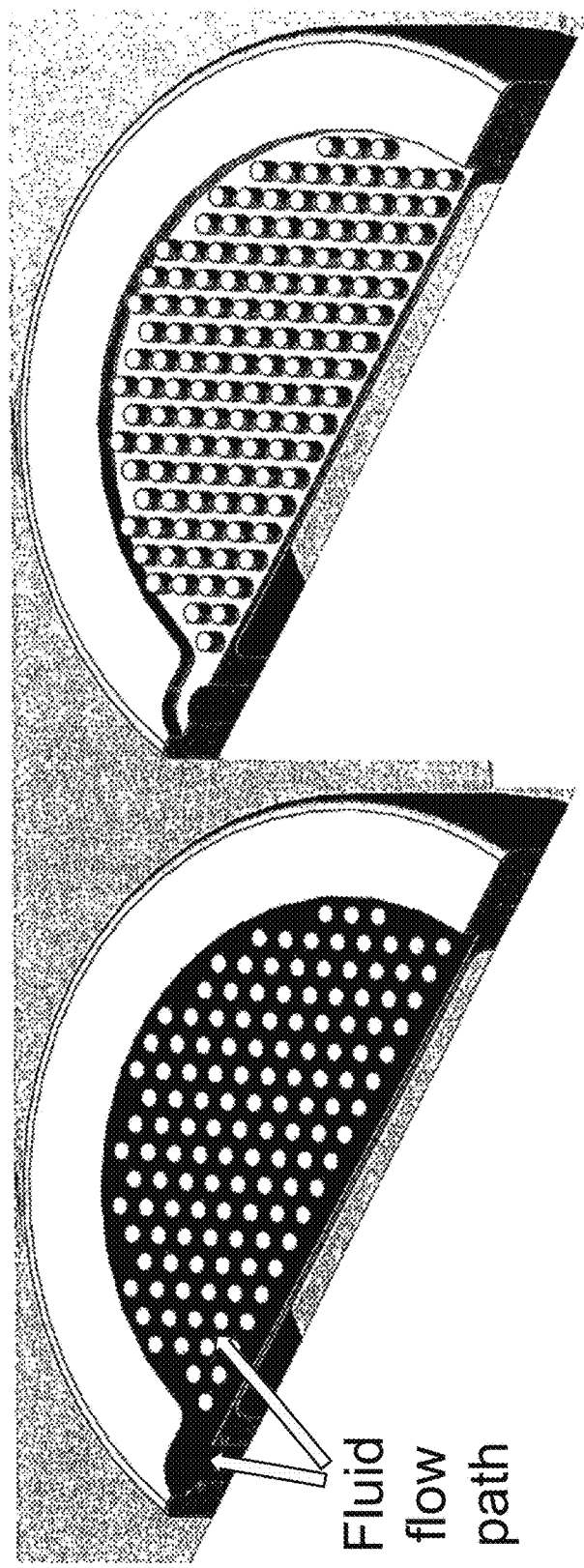
FIG. 5 is a schematic sectional view illustrating the fluid flow path in the first exemplary embodiment depicted in FIG. 1.

In a first exemplary embodiment the permeable medium is comprised by a monolithic expanded polytetrafluoroethylene membrane. Here a molded silicone elastomer comprises both the enclosure and support in the form of an array of molded posts. The permeable sheet is attached to the posts of support enclosure in a stretched or ballooned state by the use of an epoxy silicone polymer adhesive. As used herein, "ballooned" means distended so as to remove slack. In this embodiment the molded support enclosure provides a communal downstream path for filtered fluid egress between the posts to an exit port (see shaded area, labeled "fluid flow path", FIG. 5). This molded enclosure is then attached to a hard plastic support including a barb to seal the fluid enclosure, and a band hose clamp creating a sealed plenum for introduction of compressed gas behind the support structure. Applying compressed gas to the plenum allows the support to be taken from the slack state (see FIGS. 2 and 3) to the ballooned state (see FIG. 4). Thus, in this embodiment, the support is comprised by a solid 3-dimensionally structured elastomer and actuation of the transitions between ballooned and slack states is accomplished by pneumatic means. A detailed description of an apparatus to transition between the slack and distended states via controlled pneumatic means while measuring pressure and flow during separation of solids from a fluid stream is included hereinafter with descriptions of the experimental techniques. Examples of the performance of this device are also provided, including those with filter media comprised by both monolithic and asymmetric composite ePTFE membranes.

Figure 9:
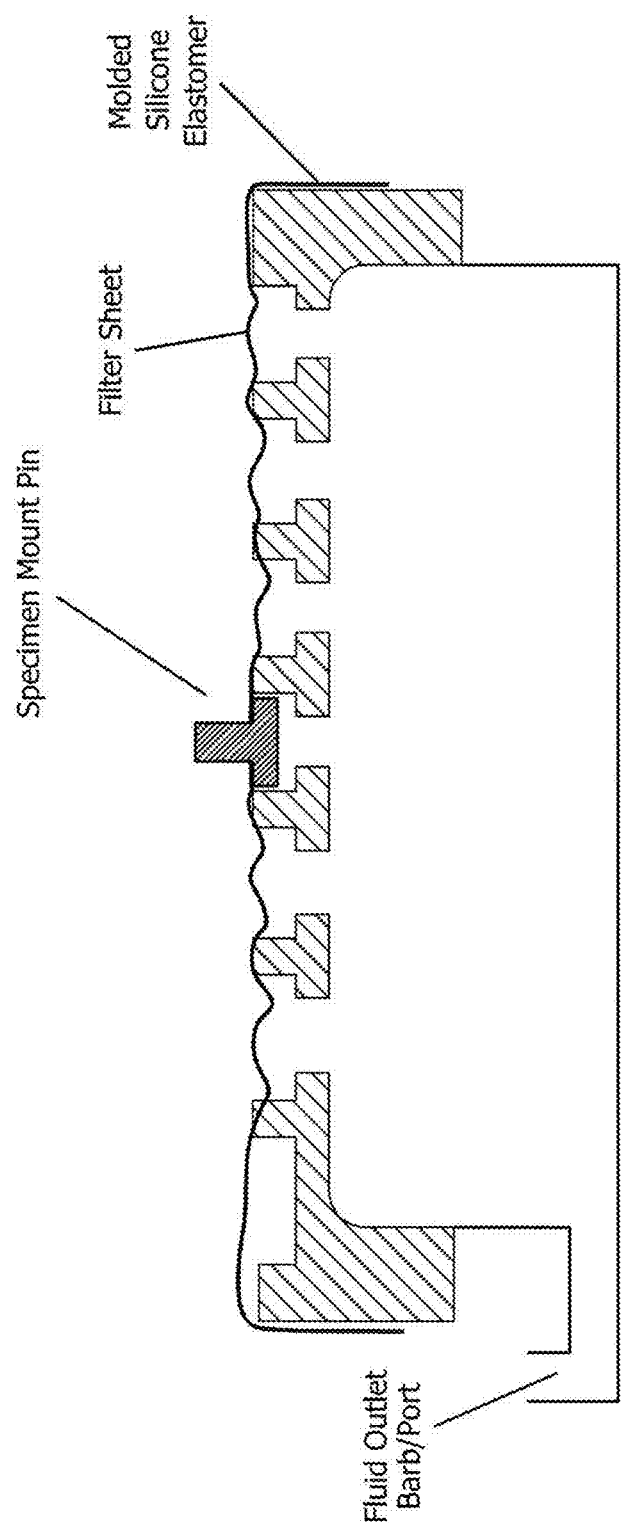
FIG. 9 is a schematic view representing a second exemplary embodiment of the present invention in a slack state.

In a second exemplary embodiment depicted in FIG. 9, the permeable medium is comprised by a monolithic ePTFE membrane. Here, support is provided by a permeable array of silicone posts with molded perforations through the diaphragm which is also a permeable sheet. The permeable medium is attached to the support while it is in a stretched or ballooned state by the use of discrete portions of an epoxy-silicone polymer adhesive on the post tips. The support is then allowed to return to its original state, thus displacing medium to a slack state, and is sealed to an enclosure by means of a hose clamp. The center of the support and the membrane are sealed to a small circular pedestal which provides a point of attachment for a mechanical arm. The mechanical arm is then attached to the linear motion actuating arm of a rod in a linear shaft bearing driven using a cam and a servo-controlled electric motor. Thus the second exemplary embodiment demonstrates a porous or permeable elastic support material and actuation of the transitions between ballooned and slack states is accomplished by a mechanical means. A detailed description of an apparatus to transition between the slack and ballooned states via controlled mechanical means while measuring pressure and flow during separation of solids from a fluid stream is included hereinafter with descriptions of the experimental techniques.

The invention is not limited to the teachings of the above embodiments, but instead is applicable to any device comprised by a permeable medium comprised of passages or openings connecting the up and downstream faces (i.e., sides) of the medium, and preferably an elastic support. In other embodiments, a sealed enclosure separating the upstream face of the permeable sheet from the solids of the colloidal suspension or fluid stream from down stream of the clarified fluid filtered through the device, and a port or other means to allow egress, transfer or collection of filtered fluid under the motivation of a simultaneously applied positive pressure to upstream face of the sheet or negative pressure to downstream enclosure. The medium is affixed to the elastic support in a ballooned state at one or several discrete locations so as to allow transfer of fluid through the medium while keeping solids outside the seal.

The permeable filter medium as embodied herein is comprised of a solid material or film with pores, passages, or openings connecting the up and down stream faces of the material. Suitable filter sheets can be, but are not limited to those comprised by woven or knit meshes produced from mono or polyfilament fibers or wires, non-woven materials produced via known methods in the art including fiberspinning, fiberblowing, wetlaying, microporous membranes produced by methods in the art including paste processing and expansion, phase inversion, and by processes of foam production including particle sintering, gas expansion and dissolution of matrix components. Preferred are ePTFE membranes including monolithic, layered, and asymmetric compositions including those ePTFE membranes suitable for this invention include those produced by processes described in U.S. Pat. Nos. 7,306,729, and 4,902,423, and combinations of ePTFE membranes with those described in references described in the above art which are incorporated herein by reference.

The elastic support herein is comprised of a suitable elastomer material with the ability reversibly extend to a distended state under stress and return to an original state in the absence of stress. Here an elastomer is a polymer material which extends under the influence of applied loads below the yield strength of the material and returns to its original form when the load is removed. The elastic support can be porous, non-porous, solid, of a specific 3d form or discontinuous, permeable or impermeable to fluid flow through the support, so long as it can attain the desired distended state and return to the original state when load is removed. Examples of suitable supports include molded elastomer or thermoplastic elastomer parts with 2D or 3D structure, woven elastomers, non-woven elastomers, porous elastomer foam, and/or porous elastomer membrane produced by methods known in the art.

The sealed enclosure separating the "upstream" particle laden colloidal suspension or fluid from the "downstream" filtered fluid which has been clarified or separated by passage or filtration through the sheet can be soft or rigid and is not limited so long as it provides an integral seal so as to prevent passage of fluid or solids to the down stream of the permeable filter medium except the clarified fluid that passes through the permeable filter medium. Suitable materials for construction of the enclosure include metal, plastic, wood, ceramics, rubber, and hybrids or composites thereof.

The enclosure should provide at least one means of egress for the clarified fluid. This can take the form of a port or outlet for the filtered, separated or clarified fluid which has passed through the permeable medium. This egress or transfer of fluid from the down stream can be under the motivation of a simultaneously applied positive pressure to upstream face of the sheet or negative pressure to downstream enclosure. Furthermore, optionally this filtered or clarified fluid can be collected, passed on to another process operation, discharged, or returned in whole or in part to the upstream.

The elastic support should be affixed or attached to the filter sheet. This attachment can be at a single or at several discrete points. Although posts are used in the illustrated embodiment, arrays of lines or more complex patterns may be used in alternative embodiments. The attachment is to be performed to the elastic support in its distended state to form a composite or device. Here distended is taken to mean that a load is applied to the elastic support to increase the geometric area of the support to between 10 and 1000% areal strain (Areal strain=geometric area of support under load/geometric area of the support with applied load) where the applied load is less than the yield stress of the support. Furthermore, distension here is taken to mean that the support deforms outward from the original surface of the membrane in a direction orthogonal to all or part of the convective fluid flow of the particle laden feed stream (i.e., out-of-plane). In particular, the distension should be conducted in such a fashion as to promote ejection of particles from the filter surface. (Also, henceforth the case where the elastic support is not loaded will be referred to as the "slack" state.) An essential and novel aspect of the instant invention is that the permeable medium is affixed to the elastomer in the ballooned state and allowed to return to the slack state. This is key as it enables a ballooned state in which the area of the permeable sheet exceeds that to which a permeable sheet attached to the support in a slack state could obtain without damage or compromise of structure were it stretched or inflated to the dimensions of the distended state. The elastic support and attached filter medium are ballooned to any radius of curvature necessary to expel the particulate build-up on the high pressure side of the filter medium. This radius of curvature, and the pressure or other force used to produce it, may be varied as needed according to the characteristics of the fluid and the suspended component. The attachment should be such that it does not occlude all fluid flow through the filter sheet and that the sheet remains permeable to fluid flow after attachment. Also the filter sheet must be such that it retains its ability to separate solids on its upstream face after attachment to the elastic support and return to the slack state. Accomplishing the aforementioned attachment can be by appropriate methods known methods in the art. Exemplary means of attaching the support structure to the sheet include by compression under load or with heat or by adhesive at the edges, across the surface uniformly, or discretely as in a laminate.

Additionally it should be noted that the position of and attachment of the filter sheet to the support structure is not limited to the downstream side of the filter sheet. The attachment may also be achieved by attachment of the support to the upstream side of the filter sheet so long as the filter sheet retains its ability to separate solids on its upstream face after attachment to the elastic support and its ability to transition from a ballooned to a the slack state.

Furthermore, the invention also pertains to a method of filtration wherein the device described above is autogenously cleaned by alternating the elastic support between a ballooned and slack state during the course of filtration so as to discharge accumulated solids from the medium or its surface. The exemplary embodiments described above provide only non-limiting examples of pneumatic (air pressure driven) and mechanical means of actuating the transitions between the ballooned and slack states for purposes of illustration. The method of filtration comprises any method for separation of solids so long as it involves transitioning the support from a ballooned to a slack state while continuously transferring fluid from the upstream (high pressure) side of the filter to the downstream (low pressure) side. The frequency of the transition between the states can be from cycles per day to cycles per second. The examples described here include pneumatic and direct mechanical actuation of the transition, but the method also encompasses magnetic, electric field, chemically driven by pH or swelling, driven by dimensional changes in response to light, or thermally driven actuation of transitions between the states. Furthermore, the examples herein exemplify the device and method in a non-limiting circular, planar, diaphragm form; however, tubular, square, or three dimensionally structured embodiments are also possible.

An alternate embodiment is depicted in FIG. 13, wherein the elastomer support takes a tubular form. The tubular elastomer support 130 is decorated with posts 131 as in previous embodiments and posts 131 are bonded to filter sheet 132. The ends of the tube are then embedded in a flexible or elastic material 134 so that the tube may be inflated to transition between ballooned and slack states via application of compressed air to a central plenum. Fluid flow may then be withdrawn from the flow path including spaces 135 between the posts via the outlet port 136.

It is also possible in alternative embodiments for the actuating mechanism for the alternation between slack and ballooned states to be provided by the same pump force used to drive the fluid flow. Significant energy savings are realized using this invention.

Figure 1:
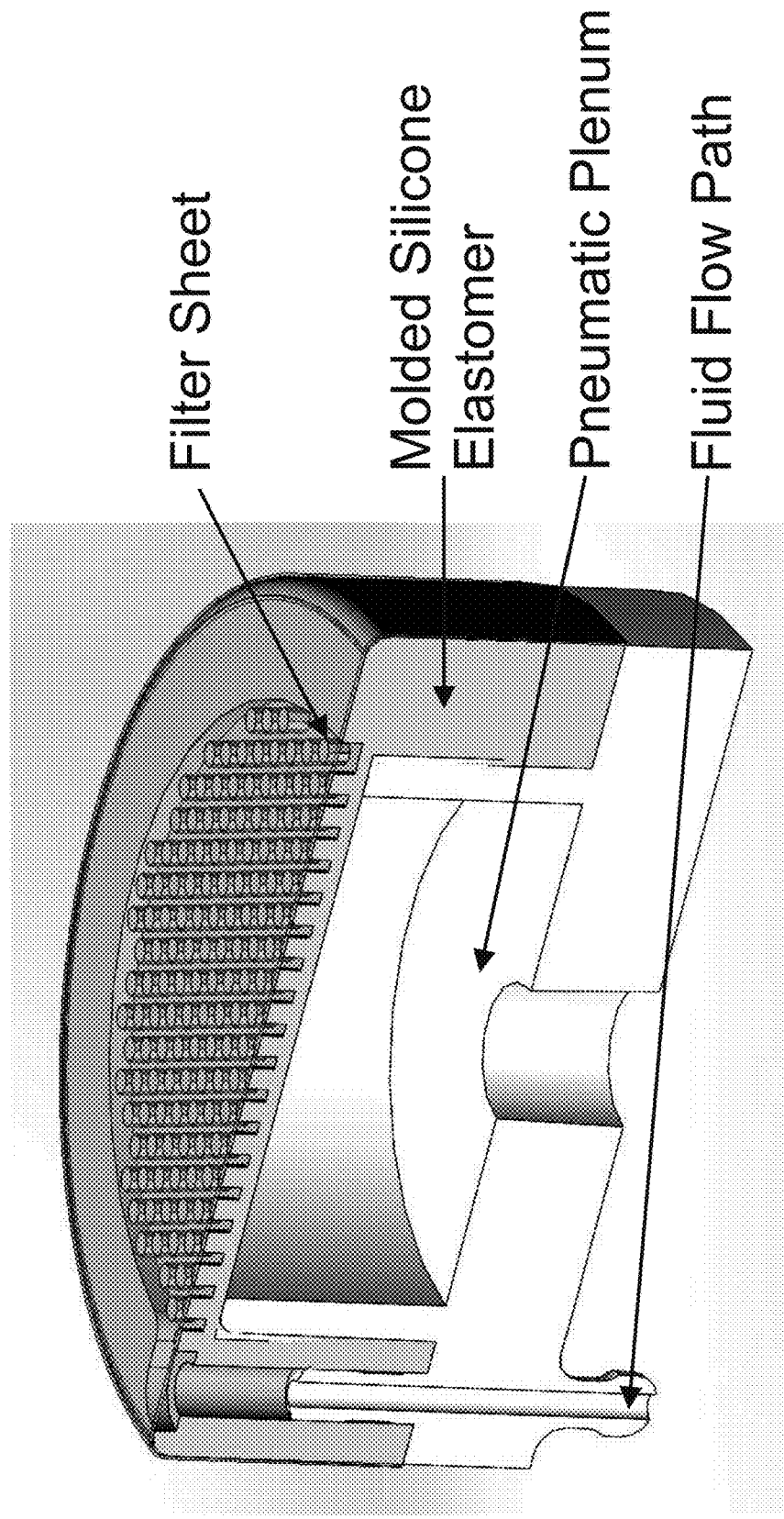
FIG. 1 is a schematic sectional view of a first exemplary embodiment of the present invention utilizing a filter sheet and elastic support.

FIGS. 14a, 14b, 15, and 16 depict alternative forms of the above said alternative embodiment wherein the pump force applied to the diaphragm is also used to drive fluid flow. In FIG. 14 the previously described embodiment of FIG. 1 is enclosed in a hemispherical chamber 140 which has two ball check valves 141a, 141b positioned on the inlet 142 and outlet 143 of the chamber. In such an embodiment, inflation of plenum 144 to the ballooned state pumps fluid out of cavity 145 and deflation of plenum 144 driven by vacuum refills cavity 145. Said embodiment has the advantage of moving the collected solids on the surface away from the filter sheet with each inflation cycle leading to enhanced cleaning performance. Furthermore inflation of the plenum to the ballooned state can result in a synergistic cleaning interaction between the surface of the cavity and the filter sheet.

Figure 15:
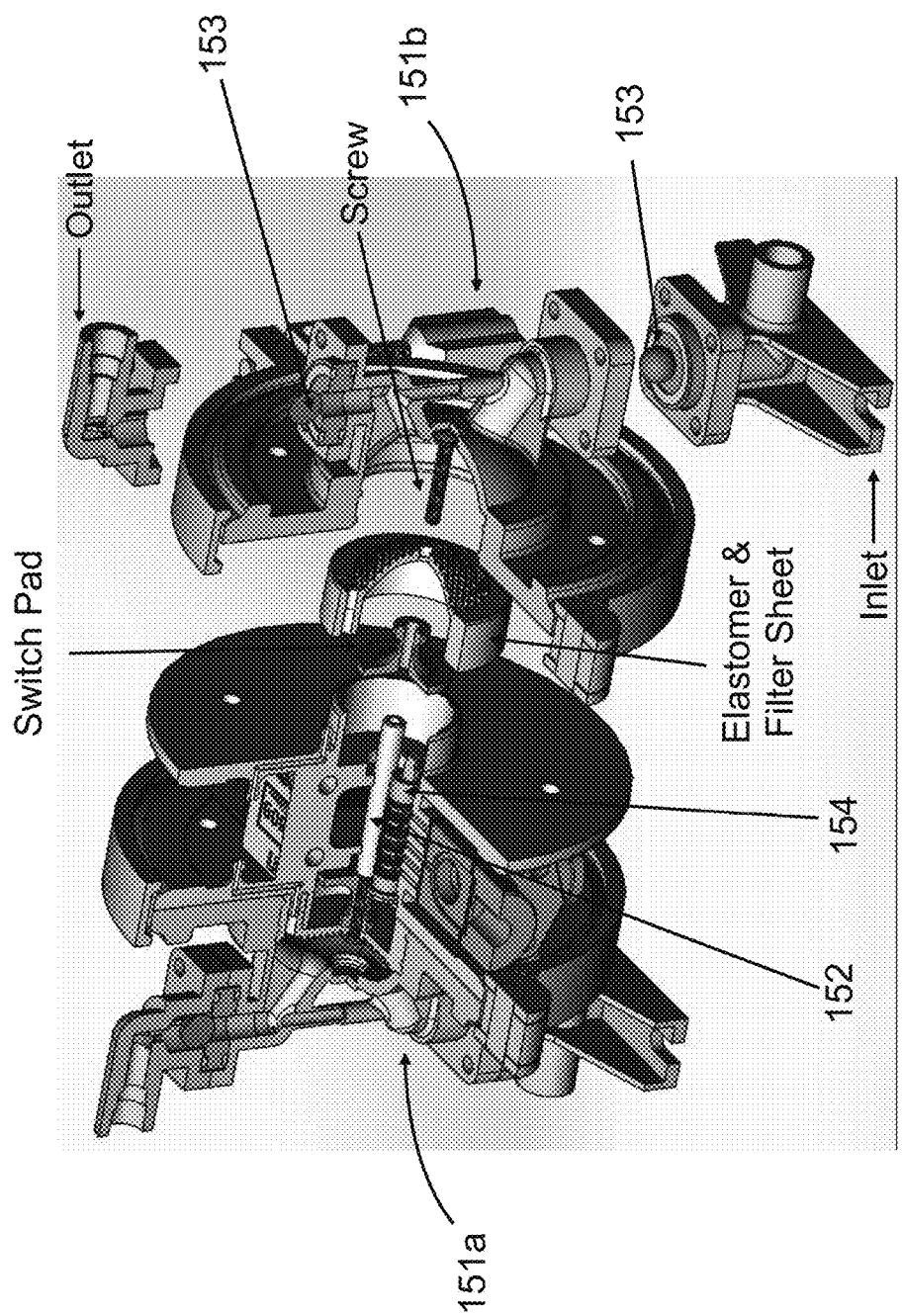
FIG. 15 is an exploded cross-sectional perspective view of an alternative embodiment wherein two cavity enclosed embodiments of the disclosure are combined with the pneumatic engine and logic of an air operated double diaphragm pump and a linking rod.
Figure 16:
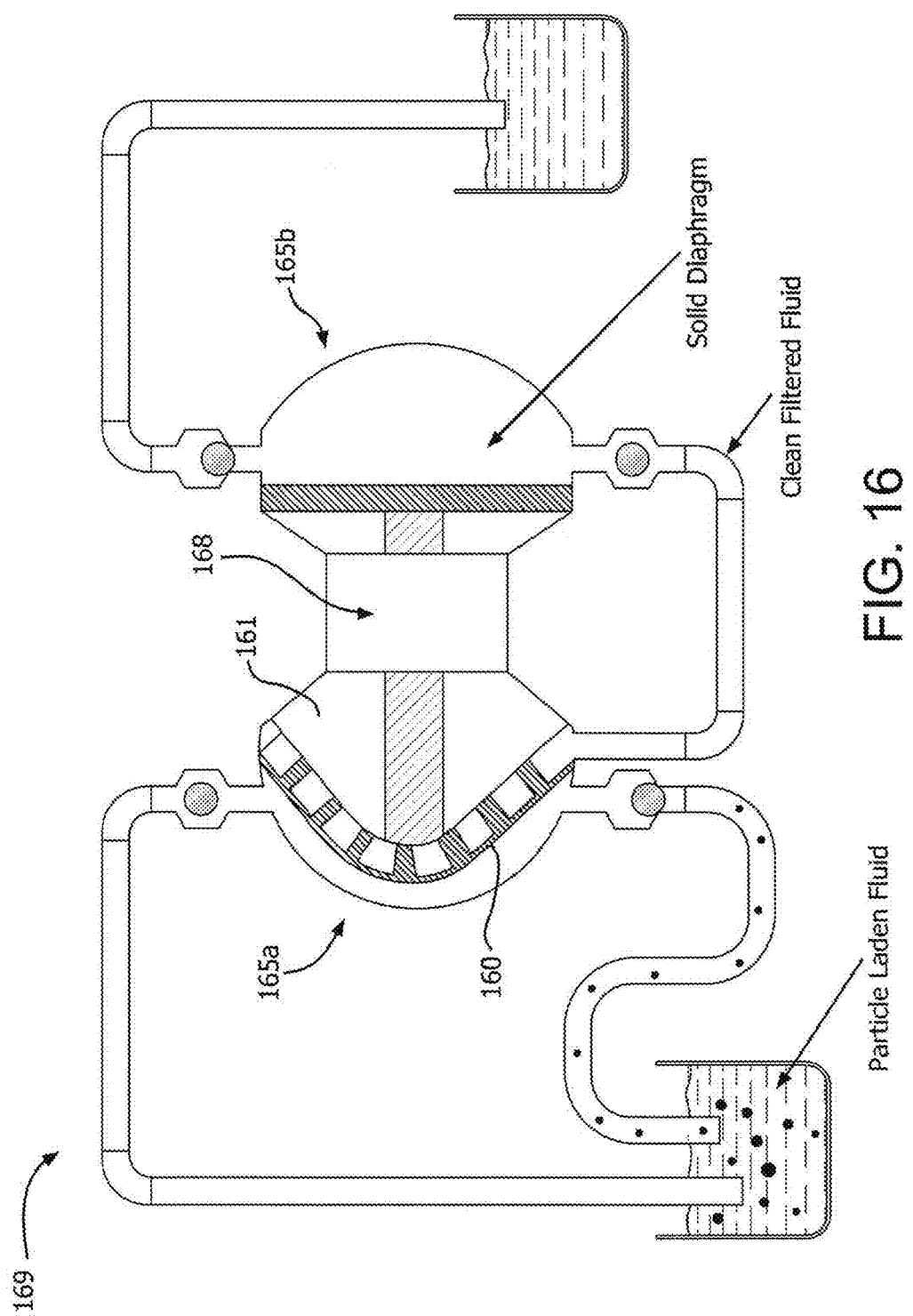
FIG. 16 is a side view of an alternative embodiment wherein a double diaphragm is used, with one side as a solid diaphragm and the other side as the elastomer-supported filter sheet of the embodiment of FIG. 1.
Figure 17A:
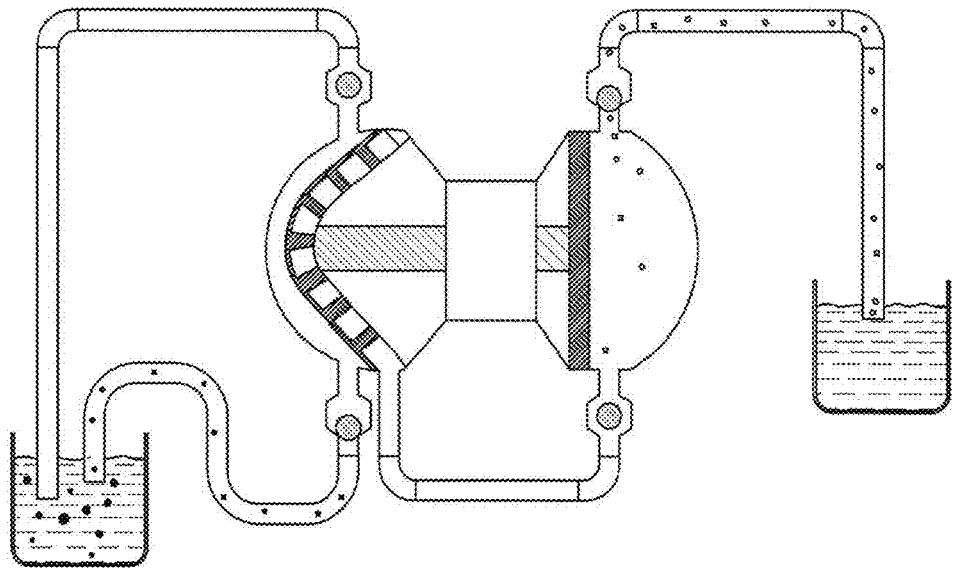
FIGS. 17a-e are side views of the sequence of pumping and particle ejection of the embodiment of FIG. 16 as it switches between ballooned and slack states through a displacement cycle.
Figure 17B:
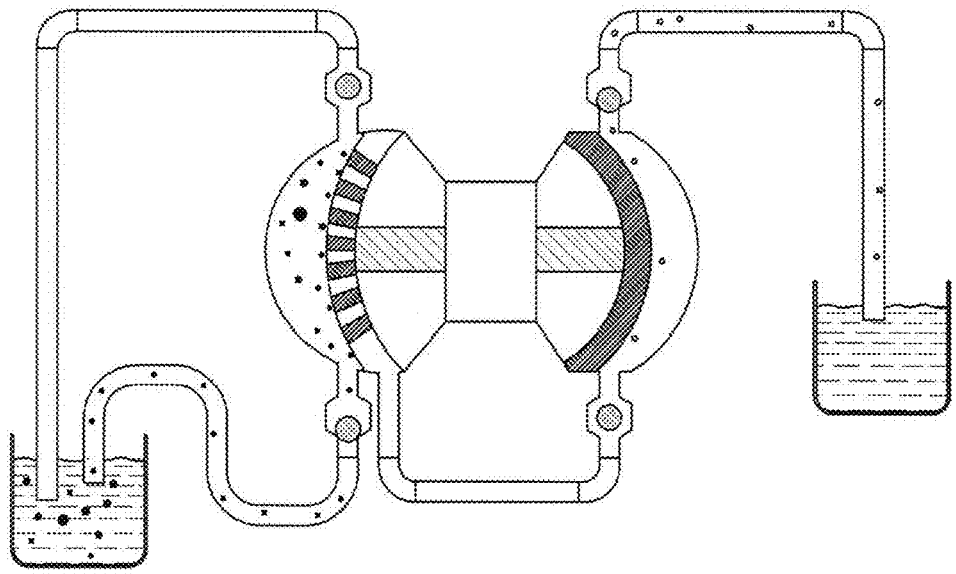
Figure 17C:
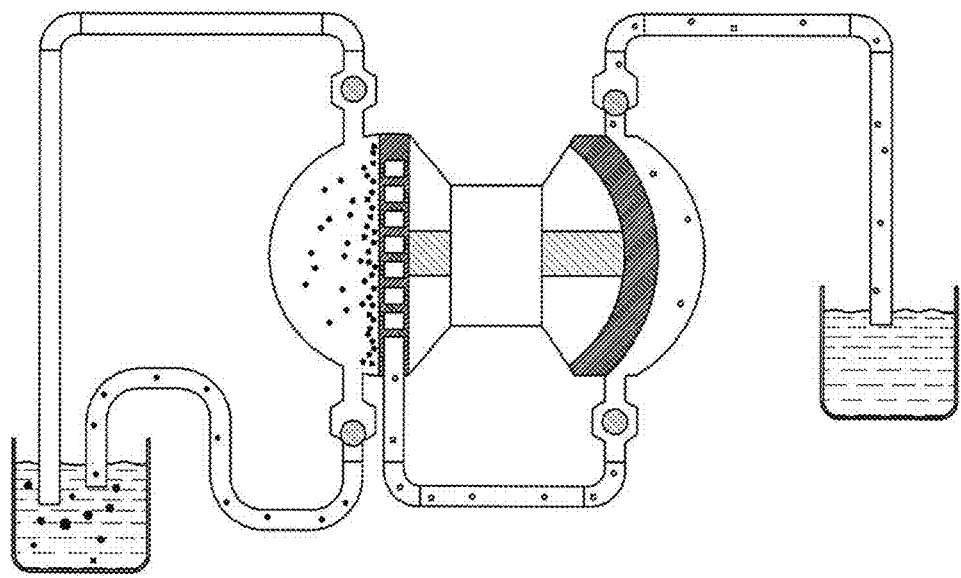
Figure 17D:
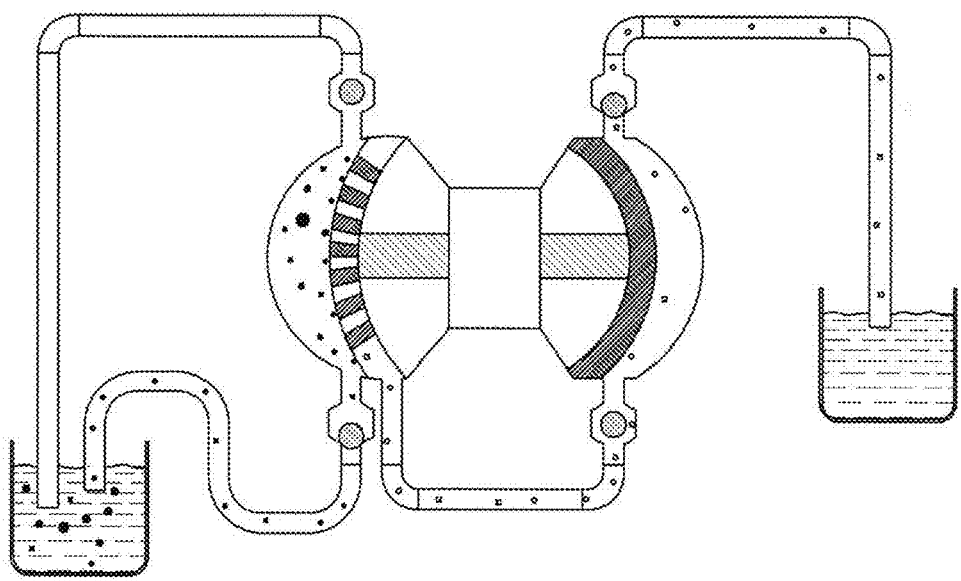
Figure 17E:
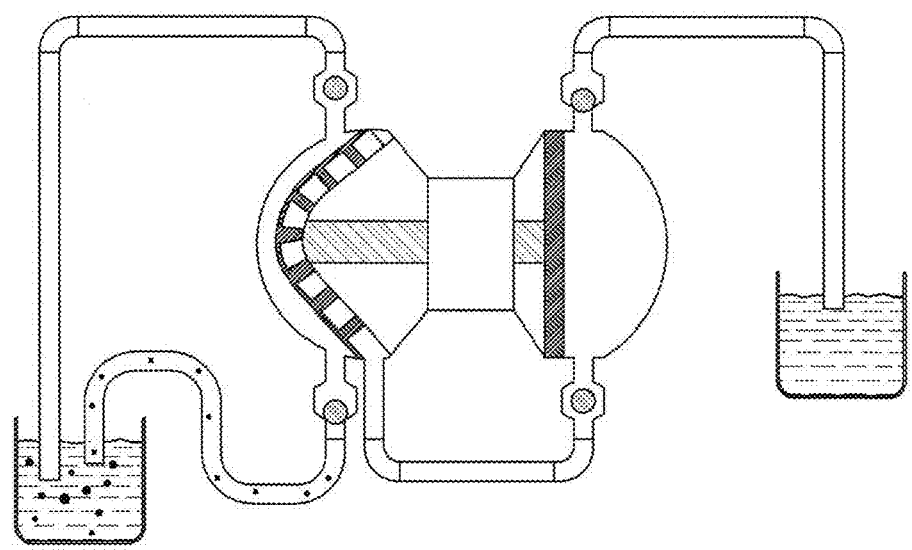
Figure 18:
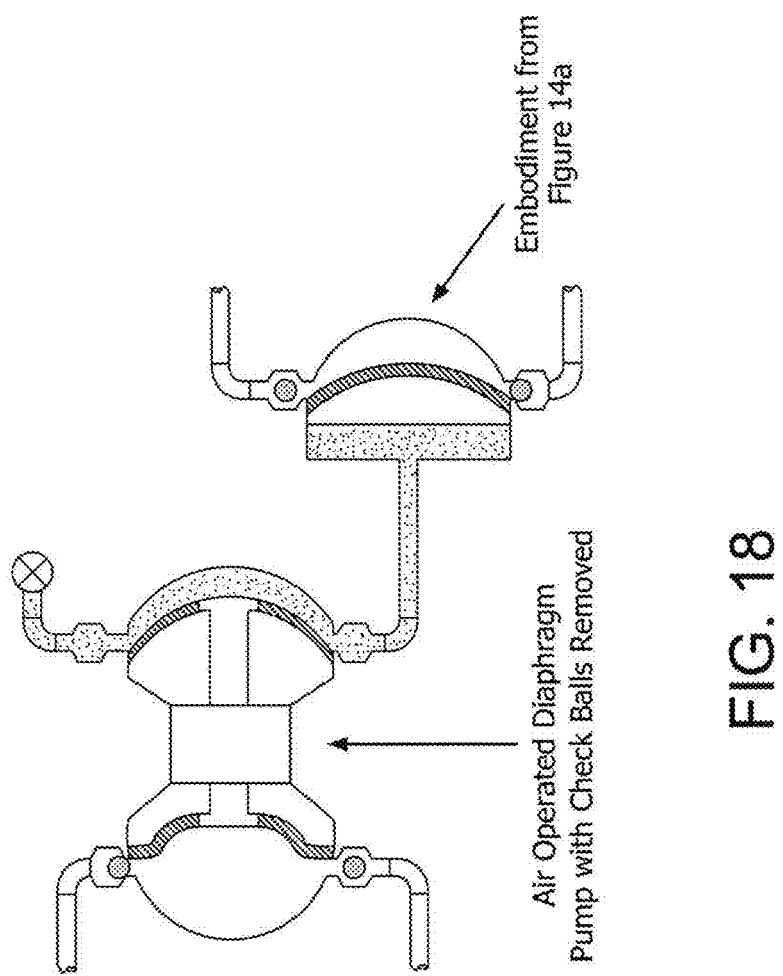
FIG. 18 is a side cross-sectional view of a double diaphragm pump having an embodiment of the disclosure and wherein the ball check valves have been removed so as to drive the transition between ballooned and slack states by the accompanying reciprocal displacement.
Figure 19C:
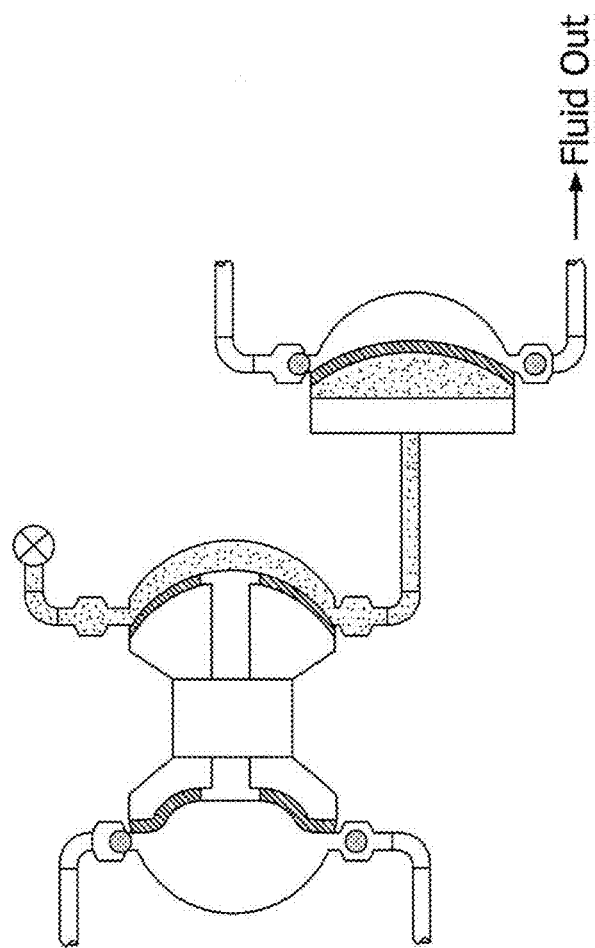
Figure 20A:
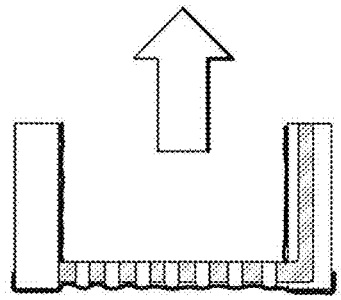
FIGS. 20a-d are schematic side views another embodiment where the structured support embodiment of this disclosure is driven by volume displacement from flat or slack to concave or ballooned, then back to flat, and further to convex or inversely ballooned.
Figure 20B:
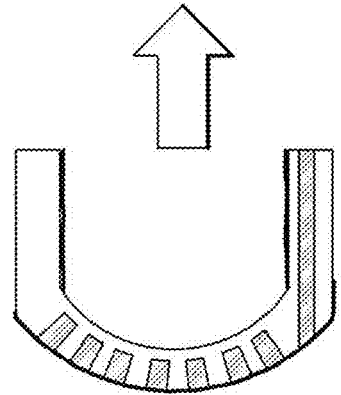
Figure 20C:
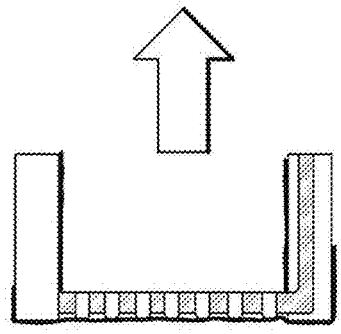
Figure 20D:
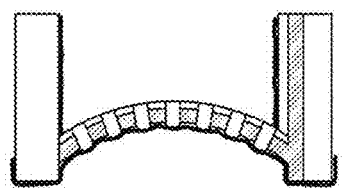
Figure 20E:
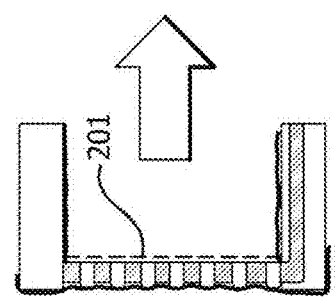
FIGS. 20e-h are schematic side views depicting a displacement cycle of an embodiment having a perforated screen placed behind the structured support, inhibiting transition to the convex state and simultaneously expelling fluid from the downstream cavity, such that the net result of the cycle is to draw fluid through the filter.
Figure 20F:
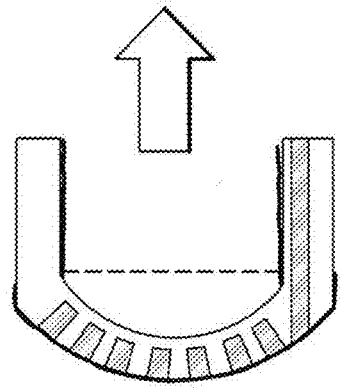
Figure 20G:
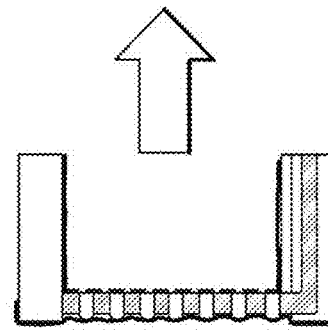
Figure 20H:
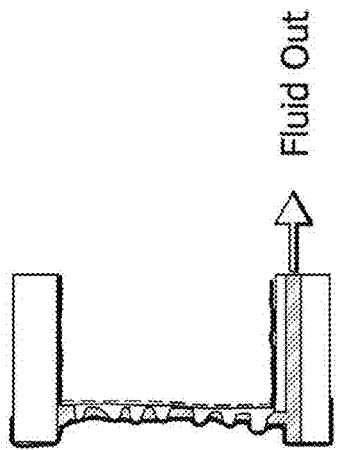

FIG. 15 depicts yet another possible alternate embodiment where two cavity enclosed elastomer diaphragms 151a, 151b are connected via a central shaft 152 and combined with the pneumatic logic typically found in an air operated double diaphragm pump. In such a system inflation of one diaphragm exhausts the other and a series of check valves 153 and pneumatic limit switches 154 alternates inflation pressure back and forth between the plenums. Such an embodiment carries the known advantages of air operated diaphragm pumps in providing fast switching rates based on pressure driven exhaust. In FIG. 16 a hybrid alternative embodiment is illustrated. Here, one side 165a of diaphragm pump 169 is used to switch the membrane covered embodiment 160 of FIG. 1 from the slack to ballooned states in a diaphragm pump cavity 161 using air operated pneumatic pump engine 168 and the other side 165b of the diaphragm pump cavity is used to supply the negative pressure to draw fluid through first membrane. Such an arrangement has the synergistic features of combining the state switching and fluid propulsion required for filtration into a single device. Furthermore such a device synchronizes flow through the membrane to the ballooning state transition and as such may offer additional benefits of enhanced cleaning and filter performance. FIGS. 17a-17e illustrate the pumping sequence of this alternative embodiment.

In FIGS. 18 and 19*a-c*, another embodiment is demonstrated in which an air operated diaphragm pump is modified by removing its ball check valves and attachment to the plenum of the enclosed embodiment described above. The fluid path of the pump as such is filled with a fluid or mixture of fluids and closed with a valve. The thus enclosed fluid passage provides a hydraulic, pneumatic, or mixed hydraulic/pneumatic leg such that displacement of the diaphragm in the air operated pump provides a change in volume to drive the structured support of the membrane back and forth between the hydraulic and pneumatic states. As such this embodiment represents another simple mechanical means to drive the change between states of the device. Such a device may be advantageous in offering high diaphragm cycle rates such as those obtained in commercial diaphragm pumps from 400-4000 cycles per minute.

FIGS. 20*a-d* illustrate another alternative embodiment. In this case the displacement cycle of a hydraulic or pneumatic leg is such that the embodiment will pass from flat to a convex ballooned state back to less than flat and a concave antiballooned state. If in such a displacement cycle there is placed a perforated screen 201 at the flat position as the filter sheet and structured support trys to pass into the convex state it is limited and cannot by the screen (FIGS. 20*e-h*). This results in a squeezing compression of the elastomeric support and a collapse of the enclosed fluid channel which leads to expulsion of filtered fluid through the outlet port. On repeat of this cycle the fluid path is returned to its original state and in the process draws filtered fluid through the filter sheet. The net novel result in such a device is that fluid is filtered without the need for an externally applied driving force in a separate pump.

The present invention may be used for any type of fluid filtration and is especially useful in connection with cake-forming or platelet-like particulates.

An additional benefit of the present invention is reduction of fouling inside (on the low pressure side) of the filter membrane.

EXAMPLES

Testing Methods and Apparatus
Apparatus for Testing Embodiment 1

The first exemplary embodiment was reduced to practice to produce the device diagramed in FIG. 1. A hard pneumatic plenum as described was rendered in a 3D CAD program (Solid Works version 2012) and printed on a 3D printer (3D Systems Viper, 3D Systems Rockhill, S.C.) via stereo lithography using DSM Somos Watershed XC 11122 resin (DSM Functional Materials Somos® Materials Group, Elgin, Ill.). The plenum was then plumbed with threaded fittings for attachment to a compressed air source and a soft tube for attachment to the fluid pump via the depicted printed barb fitting. A soft silicone elastomer support in FIG. 1 was produced by first rendering a mold design in the Solidworks program, holes for the molded posts were created using the fill pattern tool with a line array, 0.1" separation between posts, a 60° fill angle, and an edge offset of 0.02125". There were 286 posts in the array and the posts were 0.0625" in diameter. The mold was then CNC machined from Delrin based on the drawing. The silicone elastomer was then molded using an RTV silicone Mold Max 10T from Smooth On Inc (Easton, Pa.). After de-molding posts created were about 0.0625" apart (as seen in the SEM (SEM was acquired using a Hitachi TM1000 personal SEM) in FIG. 2. The molded silicone support was then stretched to put the plenum facing cavity over a rigid rod 2.125" outer diameter (~20% larger than the 1.75" diameter of the plenum facing cavity in the slack state). The top surface of the molded silicone (posts and rim) was coated with a thin layer of silicone-epoxy adhesive Silpoxy from Smooth On Inc. An eptfe membrane held taught in a knitting hoop was layed in contact with the surface, light contact pressure was applied by hand, and the adhesive was allowed to cure. The open area of the membrane was ~2.878 in$^2$ (based on a total membrane area of 3.758 in$^2$ minus the area bonded to the posts which was 0.88 in$^2$). The excess membrane was trimmed or glued to the side of the silicone support using silpoxy adhesive. The unsupported membrane over the fluid exit port in the silicone was sealed shut with silpoxy adhesive to a piece of non-woven applied on the exterior surface. The prototype as constructed was then removed from the rod returning to the slack state. The support attached to the permeable sheet in the slack state was then pulled over the rigid plenum and secured using a band clamp around the outer diameter. Several devices were constructed using the above described process and different ePTFE membranes as described later in the examples.

Figure 6:
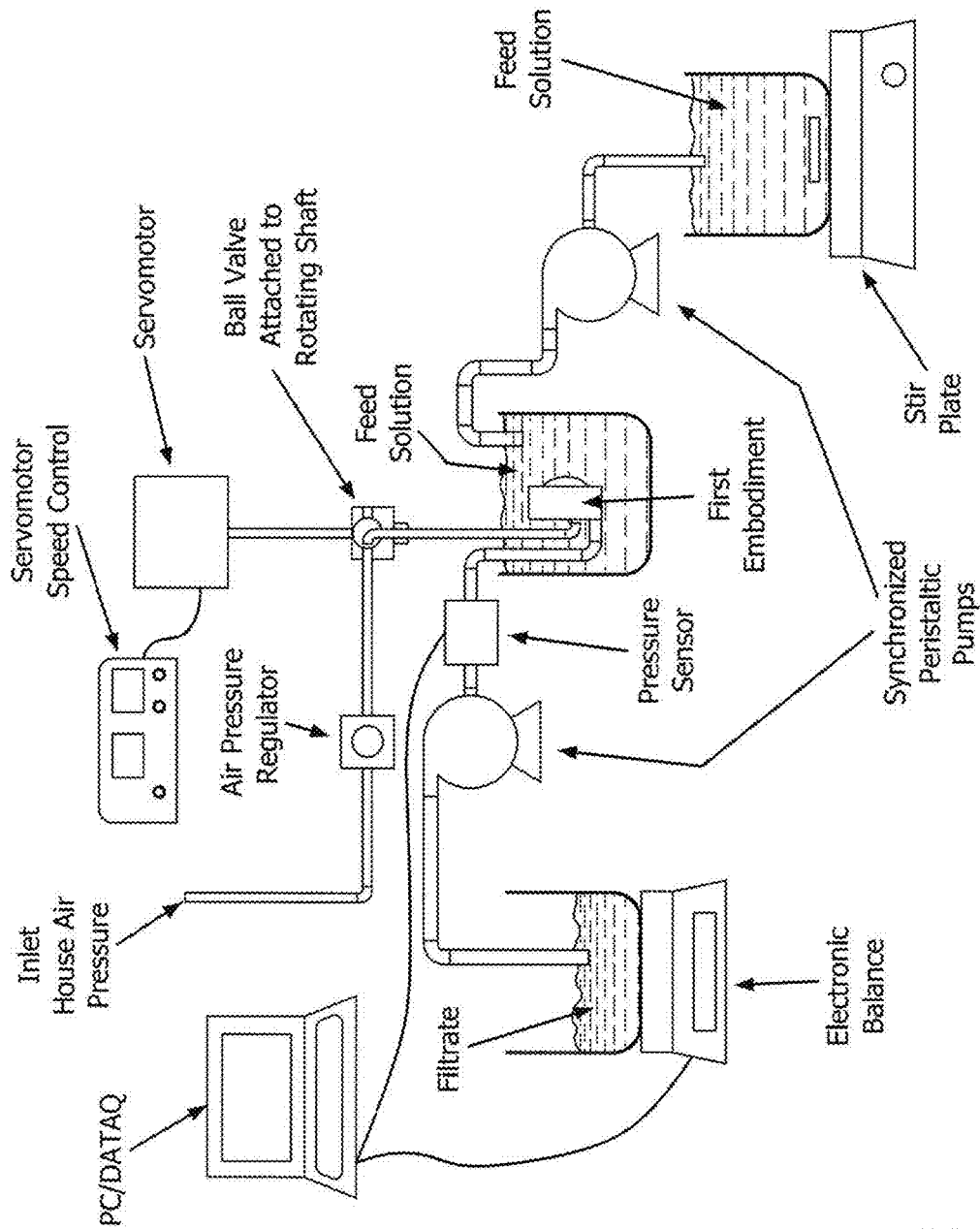
FIG. 6 is a schematic view of the experimental setup employed in Examples 1-8 using the first exemplary embodiment.

The above device of the first was then mounted in the apparatus depicted in the schematic in FIG. 6. Hard tubing was used for the compressed air feed and was used to mount and hold the device in place. The device was immersed in a glass beaker containing the test fluid. House compressed air at 80 psi was passed to a Marsh Bellofram Type 41 precision 0-30 psi pressure regulator (Cole Parmer Inc, Vernonhills Ill., PN EW-68825-22) with a digital pressure gauge. The regulated pressure was then passed to a hard mounted custom modified Miniature Pvc Ball Valve, 3-port, Npt Female X Female X Female, ¼" Pipe Size (McMasterCarr, Princeton, N.J. PN 4757K52). The open close knob for the valve was removed to allow 360 degree rotation of the ball attached to a drive shaft of an Electro Craft Servo Products E650 servo driven electric motor (Reliance Motion Control, Gallipolis, Ill.) attached to a Servodyne controller (Cole Parmer PN 4445-30, Cole Parmer Inc, Vernonhills Ill.). This motor allowed rpm controlled rotation of the L shaped channel inside the ball valve which actuated in synchronous alternation connection of the plenum to a compressed air source at a set pressure and a vent to atmosphere at ambient pressure. This resulted in an inflation of the plenum to the applied pressure and deflation of the plenum on each complete rotation of the ball valve. A multiplexed Rainin RP-1 peristaltic pump (Rainin Instrument LLC, Oakland, Calif.) was used to provide a negative pressure to the enclosure of the invented device at a set fluid flow rate. A pressure sensor and display Scilog Scipres Sensor 080-699PSX-5 and Scilog Scipres Monitor 080-690 (Scilog, Madison, Wis.) was included in the output fluid line and the output fluid was taken to an electronic balance. The mass reading of the balance and pressure read outs were taken via serial cable to a personal computer through Winwedge data acquisition software to a spread sheet in Microsoft Excel for recording at a minimum of 1 second intervals. The mass versus time data was converted to liquid flow rate equivalent based on a density of water=1 g/cm$^3$. Tests were conducted with a suspension of solids in fluid comprised by a 0.0008 wt % suspension of 1 micron polystyrene latex spheres (Polybead PN07310 Polysciences Inc, Warrington, Pa.) in a solution of 0.1 wt % Triton x100 (PN215680010 Acros Chemical, Geel, Belgium) in deionized water with 18 MΩ resistance from a MilliQ system. This solution was made by adding 1.05 g of Polybead stock solution (2.61% polystyrene latex solids as reported by manufacturer) to 3500 g of a 0.1 wt % solution of TritonX100 in deionized water. A second synchronized Rainin RP 1 pump was used to feed the above solids suspension into the beaker with the immersed test fixture at the same rate as the pump attached to the enclosure of the invented device. The feed suspension was placed on a magnetic stir plate and stirred with a Teflon stir bar at ~100 rpm to keep the suspended solids uniformly dispersed.

Apparatus for Testing Embodiment 2

The second exemplary embodiment was reduced to practice to produce the device diagramed in FIG. 9. The liquid permeable soft silicone elastomer support with through plane passages seen in FIG. 9 was produced by first rendering a mold design in the Solidworks program, holes for the molded posts were created using the fill pattern tool with a line array, 0.175" separation between posts, a 60° fill angle, and an edge offset of 0.03125". There were 76 posts in the array and the posts were 0.075" in diameter. The silicone diaphragm had a thickness of 0.075 inches and was perforated with array of posts to create molded holes created using the fill pattern tool with a line array, 0.175" separation between posts (holes in final modeled diaphragm part), a 60° fill angle, and an edge offset of 0.03125". There were 75 holes (passages through the molded part) in the array, the holes were 0.09375" in diameter, and the open area of the holes was 0.517 int. The mold was then CNC machined from Delrin based on the drawing. The silicone elastomer was then molded using an RTV silicone Mold Max 10T from Smooth On Inc (Easton, Pa.). The permeable molded silicone support with through plane holes was then stretched to put the back cavity over a rigid rod 2.125" outer diameter (~20% larger than the 1.75" diameter of the plenum facing cavity in the slack state). The top surface of the molded silicone (posts and rim) was coated with a thin layer of silicone-epoxy adhesive Silpoxy from Smooth On Inc. An eptfe membrane held taught in a knitting hoop was layed in contact with the surface and the adhesive was allowed to cure. The open area of the membrane was ~2.878 in$^2$ (Based on a total membrane area of 3.422 in$^2$ minus the area bonded to the posts which was 0.336 in$^2$) The excess membrane was trimmed or glued to the side of the silicone support using silpoxy adhesive. A hole was die cut in the center of this membrane on support stack and the pin of an aluminum specimen mount with ⅛" pin and ½ inch head (PN16111 Ted Pella, Redding, Calif.) was passed through the stack from the support side, the pin side of the specimen mount was coated with Silpoxy adhesive prior to attachment, and specimen mount/membrane stack was allowed to fully cure. A hard plastic enclosure was rendered in a 3D CAD program (Solid Works version 2012) and printed on a 3D printer (3D Systems Viper, 3D Systems Rockhill, S.C.) via stereo lithography using DSM Somos Watershed XC 11122 resin (DSM Functional Materials Somos® Materials Group, Elgin, Ill.). The support membrane stack above was then attached to a 3D printed enclosure. The result was the device depicted in FIG. 9 with a fluid outlet port which was adapted to a barb and outlet tube.

Figure 11:
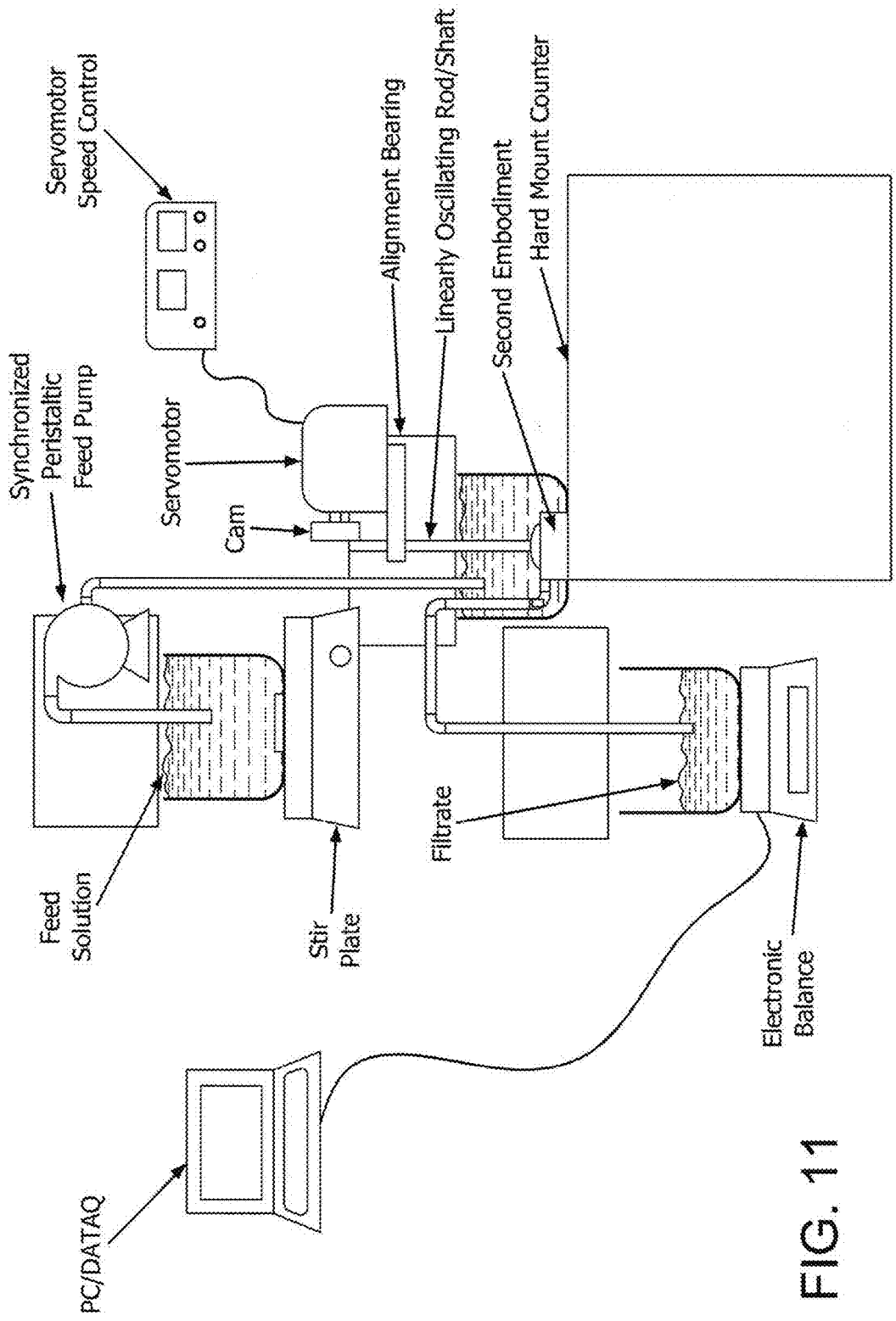
FIG. 11 is a schematic view of the experimental setup employed in Examples 6 and Comparative Examples 3.
Figure 12:
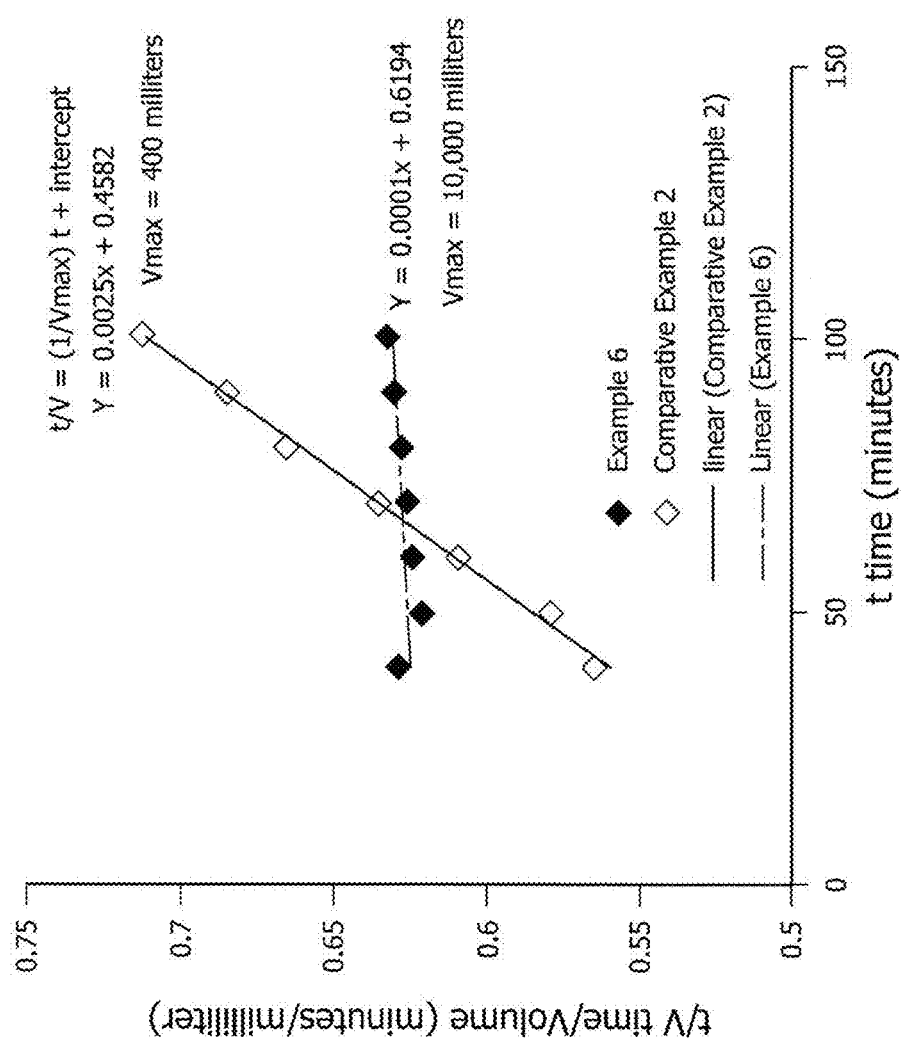
FIG. 12 is a traditional Vmax plot of t/V versus t used in the estimation of volume a filter may process before clogging for the exemplary embodiment in example 6 and the comparative example 3 (where t=time, V=volume, and Vmax is the extrapolated estimate of processable volume before clogging).
Figure 13A:
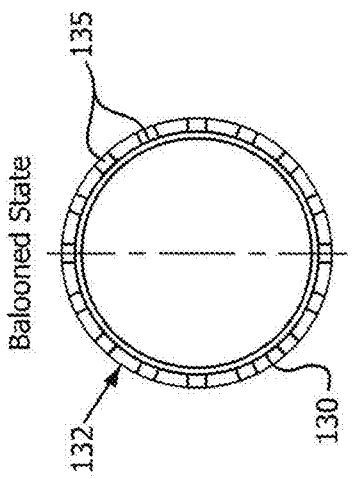
FIG. 13a is an end view of alternative embodiment of the disclosure in a slack state.
Figure 13B:
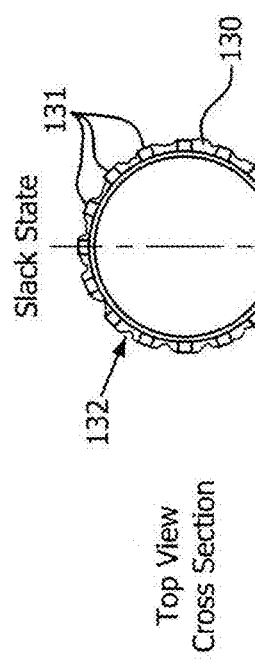
FIG. 13b is a side cross-sectional view of the alternative embodiment of FIG. 13a in a slack state.
Figure 13C:
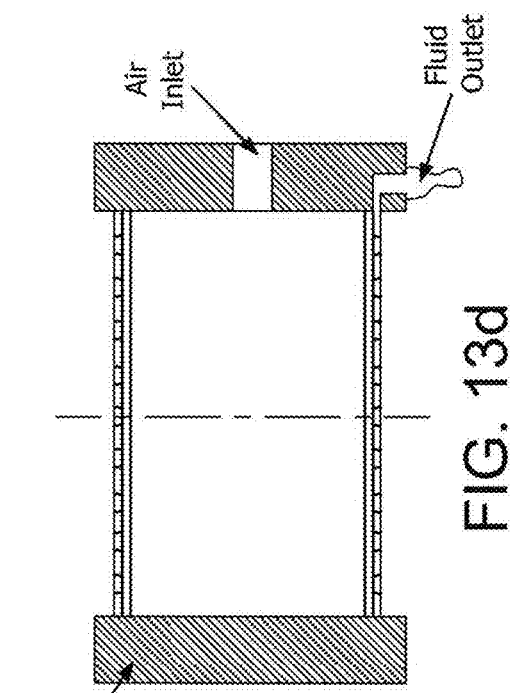
FIG. 13c is an end view of alternative embodiment of the disclosure in a ballooned state.
Figure 13D:
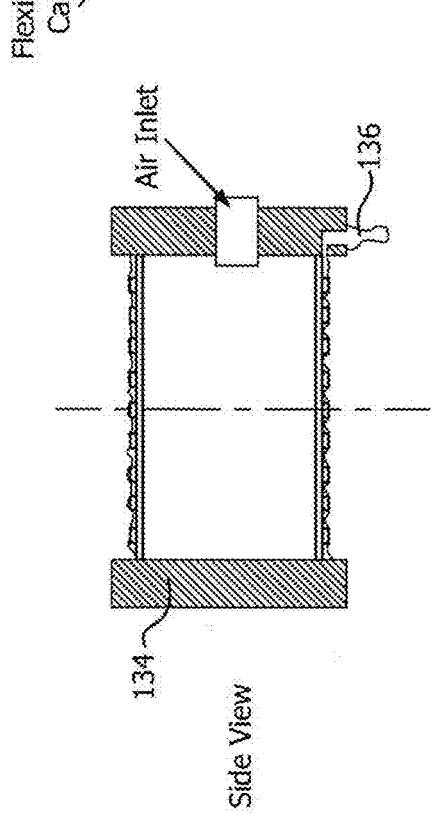
FIG. 13d is a side cross-sectional view of the alternative embodiment of FIG. 13c in a ballooned state.
Figure 14B:
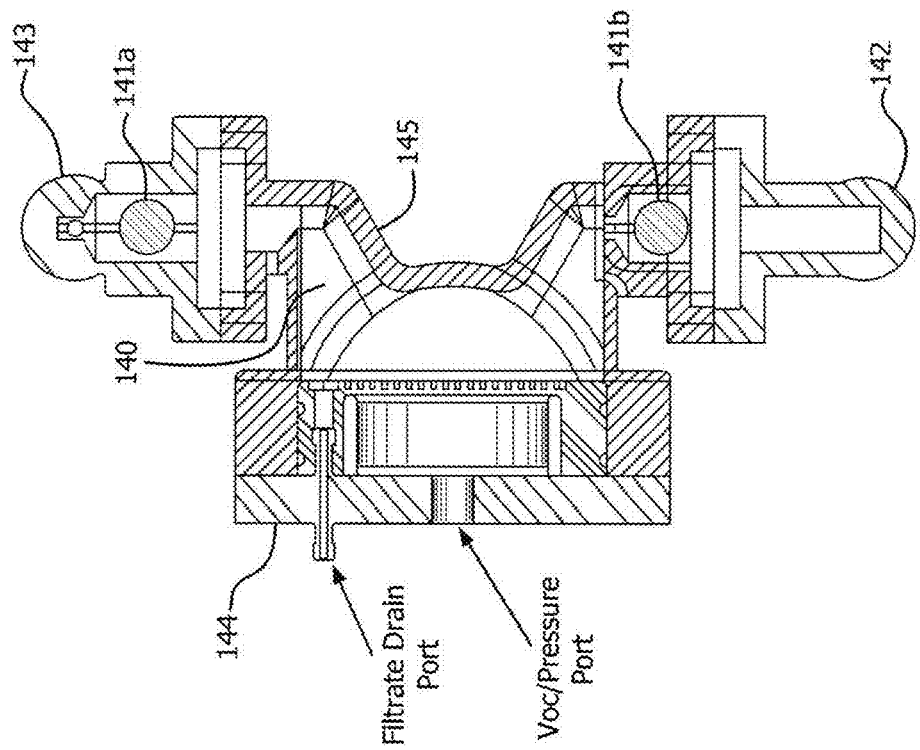
Figure 14A:
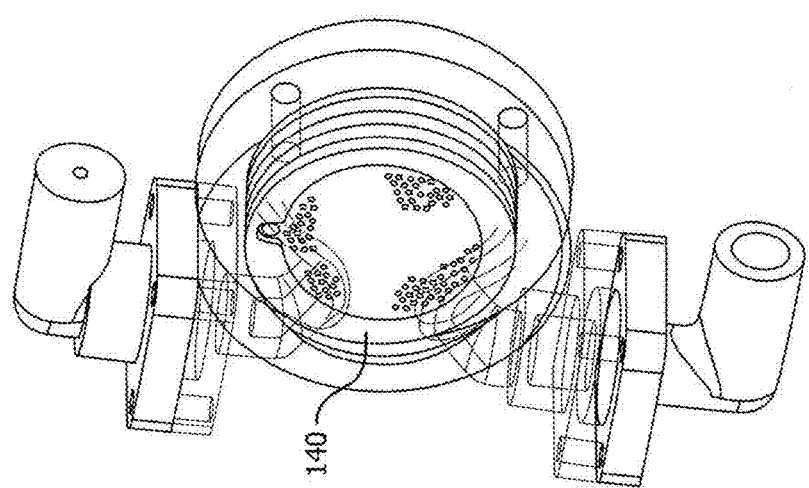
FIG. 14a is a perspective view of an alternative embodiment in which the embodiment of FIG. 1 is enclosed in a cavity to enable pumping while flowing through the filter.

The above device of the second embodiment was then mounted in the apparatus depicted in the schematic in FIG. 11. The enclosure was secured to a hard plastic base attached to a hard counter surface with screws and the device from FIG. 9 was attached to this using a twist lock with screws attached to the outside of the hard plastic base. The pin of the specimen mount was attached to a rod via a set screw. The rod/shaft provided for osicillatory linear motion up and down driven by a cam coupled to the drive shaft of an electric motor. The motor driven rod/shaft provided for a stroke distance of travel of about 0.669 inches. The motor was an Electro Craft Servo Products E650 servo driven electric motor (Reliance Motion Control, Gallipolis, Ill.) attached to a Servodyne controller (Cole Parmer PN 4445-30, Cole Parmer Inc, Vernonhills Ill.). This motor allowed for control of rod movement frequency via RPM control of the motor The fluid outlet barb fitting was arranged as seen in FIG. 11 to take filtered fluid to collection reservoir attached to an electronic balance located below the test device. For tests an auxiliary pump (Rainin RP-1 peristaltic pump) was provided and manually adjusted to feed the fluid into the test beaker keeping the fluid level constant. In this experiment flow was driven by the constant pressure of liquid head equivalent to the 40 inches of water column (4 inches in the test bucket and 36 inches the tubing to the balance and collection vessel below the test rig. The mass reading of the balance were taken via serial cable to a personal computer through Winwedge data acquisition software to a spread sheet in Microsoft Excel for recording. The data collected for mass of filtrate versus time was then processed using a density of (1 g/cm$^3$) to convert mass to volume (V) and the time stamp to calculate the flow rate (change in Volume (V)/time (t)). Data was then plotted in the t/V vs t form to calculate the expected maximum process volume before clogging (Vmax) using a least squares fit to the line in the t/V vs t plot using the standard method (slope=1/Vmax). As described in F. Badmington, M. Payne, R. Wilkins, E. Honig, Vmax testing for practical microfiltration train scale-up in biopharmaceutical processing, Pharmaceut. Tech, 19, (1995), 64. Tests were conducted with a suspension of solids in fluid comprised by a 0.1 wt % suspension of 1.5 micron 95% polymethymethacrylate/5% Divinylbenzene microspheres (PN BB01N Bangs Laboratories, Fishers, Ind.) in a solution of 0.1 wt % Triton x100 (PN215680010 Acros Chemical, Geel, Belgium) in deionized water with 18 MΩ resistance from a MilliQ system. This solution was made by adding 1. g of dry Bangs Beads to 1000 g of a 0.1 wt % solution of TritonX100 in deionized water. The feed suspension was placed on a magnetic stir plate and stirred with a Teflon stir bar at ~100 rpm to keep the suspended solids uniformly dispersed.

Thickness Measurements

Thickness of the samples was taken using a thickness snap gauge Kafer FZ1000/30 or equivalent.

Airflow Measurements

The airflow through the membranes and nonwovens was measured using a gas flow measurement system ATEQ D520 Gas flow leak tester version 1.00 (ATEQ LES CLAYES SOUS BOIS-France). The ATEQ was attached to a sample fixture which pneumatically seals an o-ring to a 1.92 cm diameter circular area of 2.9 cm$^2$ on a support screen. Air flow is then recorded in L/hr at a differential pressure of 0.174 psi (12 millibar). Air flow measured this way can be converted to other common units of measurement using the relation 164.6467/(L/hr ATEQ Value)=Gurley Second Value and Gurley Second Value=3.126/Frazier number.

Turbidity Measurement

Turbidity Measurements were made using a calibrated HACH Pocket Trubidimeter (PN52600-00 Hach Company, Loveland, Colo.).

Measurements were made per the instruments instructions and turbidity is reported in Nephelometeric Turbidity Units (NTU).

Bubble Point and Pore Size Measurements

The bubble point and mean flow pore size were measured according to the general teachings of ASTM F31 6-03 and ASTM E1294 using a Capillary Flow Porometer (Model CFP 1500 AEXL from Porous Materials Inc., Ithaca, N.Y.). The sample membrane was placed into the sample chamber and wet with SilWick Silicone Fluid (available from Porous Materials Inc.) having a surface tension of 19.1 dynes/cm. The bottom clamp of the sample chamber had a 2.54 cm diameter, 3.175 mm thick porous metal disc insert supplied with the instrument (Porous Materials Inc., Ithaca, N.Y., ~20 micron MFP based on the instrument) and the top clamp of the sample chamber was supplied by the manufacturer had a ¼ inch diameter hole. Using the Capwin software version 6.74.70 the following parameters were set as specified in the table immediately below. Using the above method a 10 micron pore size track etch membrane (Sterlitech, Kent Wash. PNPCT0113100) 9.36 microns (Sterlitech, Kent Wash. PNPCT10013100) had an instrument reported mean flow pore size of and a 100 nm pore size track etch membrane had an instrument reported mean flow pore size of 0.10 microns.

| Parameter | Set Point |
|---|---|
| maxflow(cc/min) | 200000 |
| bulbflow (cc/min) | 30 |
| F/PT (old bubltime) | 50 |
| minbppres (PSI) | 0 |
| zerotime (sec) | 1 |
| v2incr (cts) | 10 |
| predinc (cts) | 1.25 |
| Pulse delay (sec) | 2 |
| maxpre (PSI) | 500 |
| pulse width (sec) | 0.2 |
| mineqtime (sec) | 30 |
| presslew (cts) | 10 |
| flowslew (cts) | 50 |
| eqiter | 97 |
| aveiter | 20 |
| maxpdif (PSI) | 0.1 |
| maxfdif (cc/m) | 50 |
| sartp (PSI) | 1 |
| sartf (cc/min) | 500 |

Density Measurements and Porosity Calculations

Samples die cut to form rectangular sections 2.54 cm by 15.24 cm were measured to determine their mass (using a Mettler-Toledo analytical balance modelAG204) and their thickness using a the Kafer FZ1000/30 thickness snap gauge. Using these data, density was calculated with the following formula:

$$\rho = m/(l \times w \times t).$$

in which: $\rho$=density (g/cc); m=mass (g); w=width (cm); l=length (cm); and t=thickness (cm). The average of the three measurements was used.

Tensile Break Load Measurements and Matrix Tensile Strength (MTS) Calculations

Tensile break load was measured using an INSTRON 1122 tensile test machine equipped with flat-faced grips and a 0.445 kN load cell. The gauge length was 5.08 cm and the cross-head speed was 50.8 cm/min. The sample dimensions were 2.54 cm by 15.24 cm. For longitudinal MTS measurements, the larger dimension of the sample was oriented in the machine, or "down web," direction. For the transverse MTS measurements, the larger dimension of the sample was oriented perpendicular to the machine direction, also known as the cross web direction. Measurements were conducted at ambient pressure, relative humidity, and room temperature. Generally, this was 1 atmosphere, 25% relative humidity, and 21° C. Each sample was weighed using a Mettler Toledo Scale Model AG204, then the thickness of the samples was taken using the Kafer FZ1000/30 thickness snap gauge. The samples were then tested individually on the tensile tester. Three different sections of each sample were measured. The average of the three maximum load (i.e., the peak force) measurements was used. The longitudinal and transverse MTS were calculated using the following equation:

MTS=(maximum load/cross-section area)*(bulk density of PTFE)/density of the porous membrane), wherein the bulk density of PTFE is taken to be 2.2 g/cc.

Porosity was expressed in percent porosity and was determined by subtracting the quotient of the average density of the article (described earlier herein) and that of the bulk density of PTFE from 1, then multiplying that value by 100%. For the purposes of this calculation, the bulk density of PTFE was taken to be 2.2 g/cc.

Example 1

Figure 2:
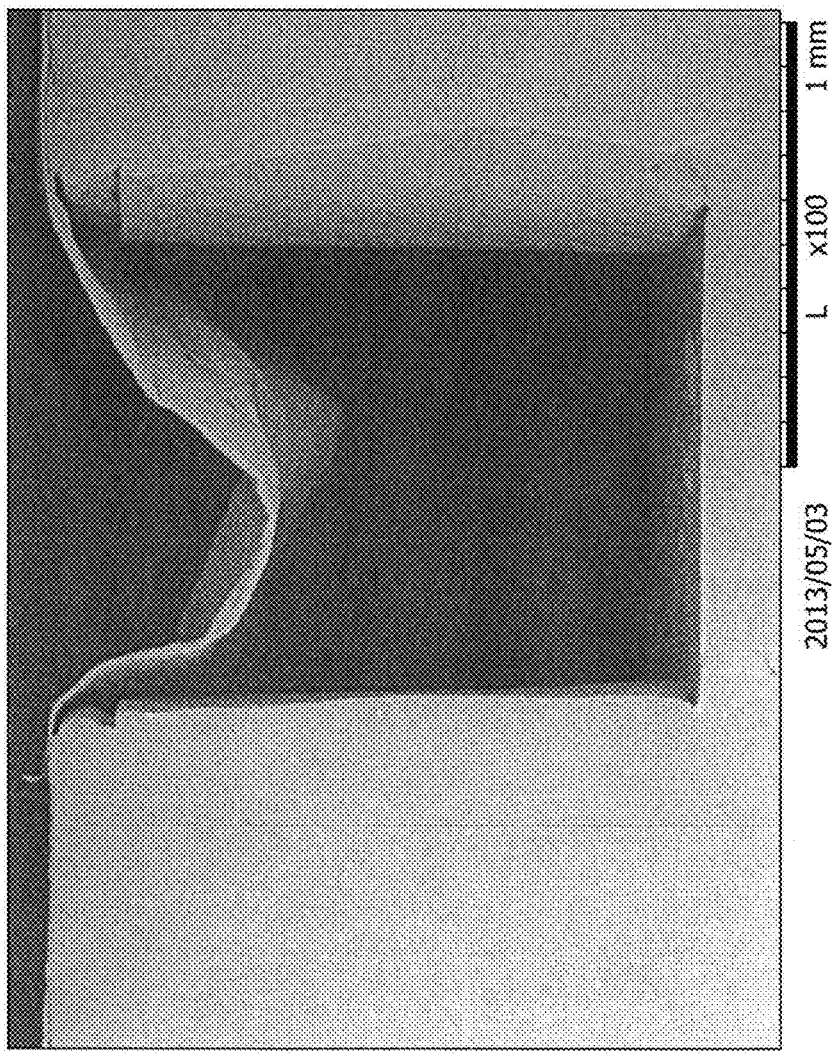
FIG. 2 is a side view SEM of the filter medium on the exemplary embodiment of FIG. 1 in a slack state.
Figure 8:
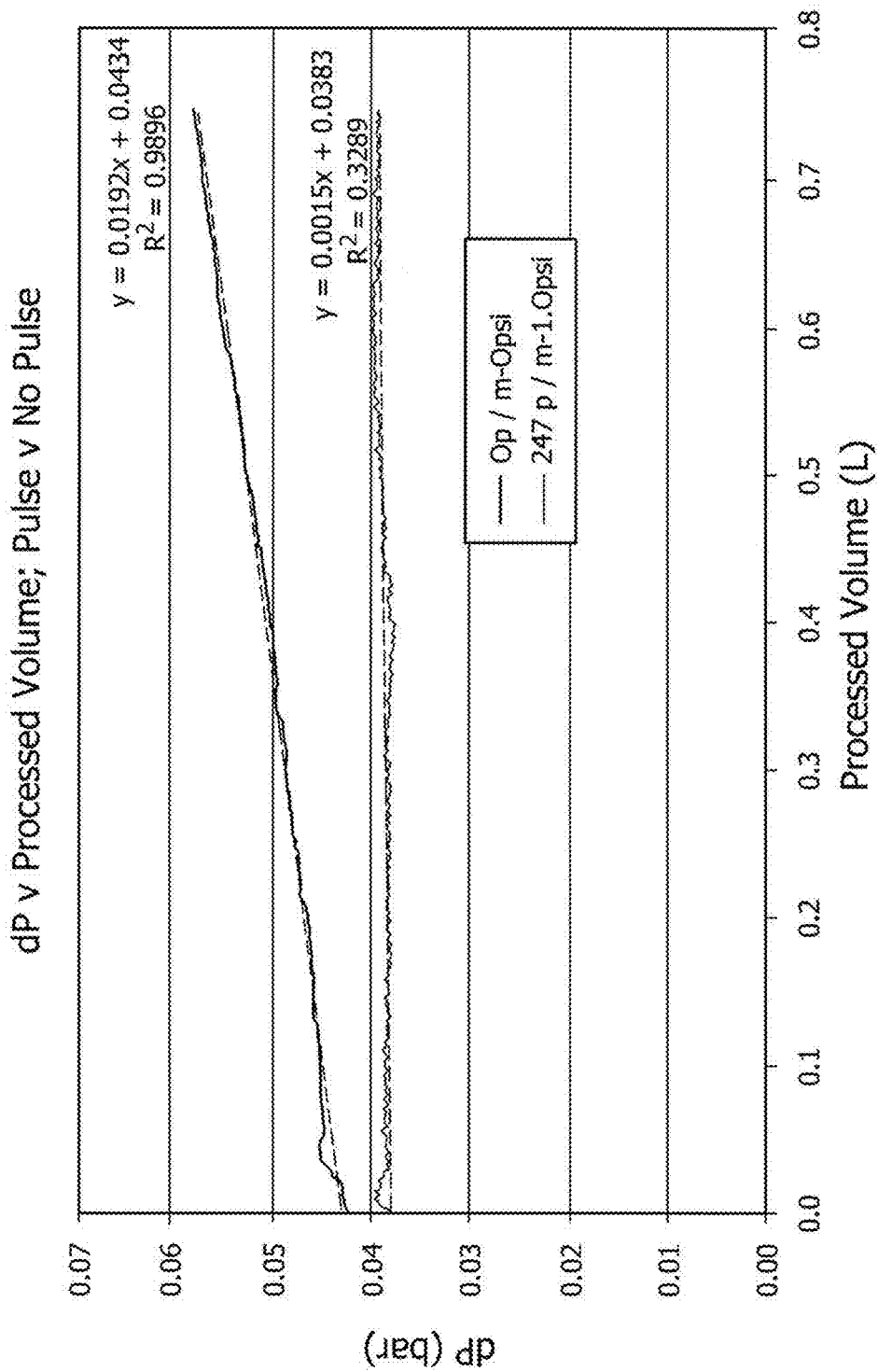
FIG. 8 is a graph representing experimentally measured transmembrane pressure curves obtained with transitions between slack and ballooned states during filtration and under conventional filtration without the transitions as described in Example 1 and Comparative Examples 1-2.

A device of the form described above as the first embodiment was assembled with a monolithic ePTFE membrane. The monolithic ePTFE membrane was made by processes known in the art for example U.S. Pat. No. 3,953,566 or 5,814,405. The membrane had an average matrix tensile strength of 18726 (PSI), an ATEQ airflow of 10.2 L/h, a bubble point of 32 psi, a porosity of 88%, a thickness of 1.99 mil, mass/area of 13 g/m², and mean flow pore size of 0.184 microns. FIG. 2 shows a cross section of the material attached to the support in the slack state. After attachment to the rubber support the unbonded area of the membrane was measured visually to be 2.878 in². The device was mounted in the test apparatus described for the first embodiment. The device was wet with isopropanol, and then immersed in water in a 1 liter glass beaker test reservoir and the downstream fluid pump was primed to fill the area between the device support structure and the membrane with water displacing air all with the membrane in the slack state. The test reservoir filled with water was exchanged for a 1 L reservoir charged with latex solids suspension in fluid described above in the apparatus section. The air pressure regulator was then set to a set point pressure of 1 psi and the servo drive for the electric motor was set to a calibrated speed of 247 rpm resulting in alternation between slack an distended states once per rpm. At one PSI the support deflects approximately 0.332" which suggests an increase an arc length of 1.92" and an approximate strain of 9%. The downstream fluid pump and the feed solution pumps were was then started and set to a constant flow rate of 15 ml/min. 720 ml of solids solution was driven through the device producing a clear filtrate (turbidity=3.8 NTU) compared to the starting solution (turbidity=50 NTU). The flow rate was stable and constant during the test and the differential pressure compared to the atmosphere was steady at 0.038 PSI for the course of the test. The pressure trace for this experiment is depicted in FIG. 8.

Example 2

A sample device was assembled prepared and primed as described in example 1 except that the ePTFE membrane was a two layer composite structure. The composite ePTFE membrane was made by processes described in U.S. Pat. No. 7,306,729. The top surface of the membrane which faced the upstream in the device had smaller pore openings as evidenced by electron microscope images. The membrane had an average matrix tensile strength of 22000 (PSI), an ATEQ airflow of 90 L/h, a bubble point of 25 psi, a porosity of 70%, a thickness of 1.45 mil, mass/area of 11.2 g/m². The air pressure regulator was then set to a set point pressure of 0.75 psi and the servo drive for the electric motor was set to a calibrated speed of 142 rpm resulting in alternation between slack an distended states once per rpm. At 0.75 PSI the support deflects approximately 0.232" which suggests an increase an arc length of 1.83" and an approximate strain of 5%. The downstream fluid pump and the feed solution pumps were was then started and set to a constant flow rate of 30 ml/min. 720 ml of solids solution was driven through the device producing a clear filtrate compared to the starting solution. The flow rate was constant through the tests. The pressure drop was 0.017 after processing 100 ml of fluid and had increased 0.008 psi to 0.025 by the end of the test after 720 ml of fluid were processed.

Example 3

A sample device was assembled prepared and primed as described in example 1 except that the ePTFE membrane was a two layer composite structure. The composite ePTFE membrane was made by processes described in U.S. Pat. No. 7,306,729. The top surface of the membrane which faced the upstream in the device had smaller pore openings as evidenced by electron microscope images. The membrane had an average matrix tensile strength of 22000 (PSI), an ATEQ airflow of 90 L/h, a bubble point of 25 psi, a porosity of 70%, a thickness of 1.45 mil, mass/area of 11.2 g/m$^2$. The air pressure regulator was then set to a set point pressure of 0.75 psi and the servo drive for the electric motor was set to a calibrated speed of 247 rpm resulting in alternation between slack an distended states once per rpm. At 0.75 PSI the support deflects approximately 0.232" which suggests an increase an arc length of 1.83" and an approximate strain of 5%. The downstream fluid pump and the feed solution pumps were was then started and set to a constant flow rate of 30 ml/min. 720 ml of solids solution was driven through the device producing a clear filtrate compared to the starting solution. The flow rate was constant through the tests. The pressure drop was 0.020 after processing 100 ml of fluid and was the same at the end of the test after 720 ml of fluid were processed.

Example 4

A sample device was assembled prepared and primed as described in example 1 except that the ePTFE membrane was a two layer composite structure. The composite ePTFE membrane was made by processes described in U.S. Pat. No. 7,306,729. The top surface of the membrane which faced the upstream in the device had smaller pore openings as evidenced by electron microscope images. The membrane had an average matrix tensile strength of 22000 (PSI), an ATEQ airflow of 90 L/h, a bubble point of 25 psi, a porosity of 70%, a thickness of 1.45 mil, mass/area of 11.2 g/m$^2$. The air pressure regulator was then set to a set point pressure of 1 psi and the servo drive for the electric motor was set to a calibrated speed of 142 rpm resulting in alternation between slack and ballooned states once per rpm. At one PSI the support deflects approximately 0.332" (distance h in FIG. 4) which suggests an increase an arc length of 1.92" and an approximate strain of 9% based on comparison of the geometrically calculated segment length to the diameter. The downstream fluid pump and the feed solution pumps were was then started and set to a constant flow rate of 30 ml/min. 720 ml of solids solution was driven through device producing a clear filtrate compared to the starting solution. The flow rate was constant through the tests. The pressure drop was 0.020 after processing 100 ml of fluid and was the same at the end of the test after 720 ml of fluid were processed.

Example 5

A sample device was assembled prepared and primed as described in example 1 except that the ePTFE membrane was a two layer composite structure. The composite ePTFE membrane was made by processes described in U.S. Pat. No. 7,306,729. The top surface of the membrane which faced the upstream in the device had smaller pore openings as evidenced by electron microscope images. The membrane had an average matrix tensile strength of 22000 (PSI), an ATEQ airflow of 90 L/h, a bubble point of 25 psi, a porosity of 70%, a thickness of 1.45 mil, mass/area of 11.2 g/m$^2$. The air pressure regulator was then set to a set point pressure of 1 psi and the servo drive for the electric motor was set to a calibrated speed of 247 rpm resulting in alternation between slack and ballooned states once per rpm. At one PSI the support deflects approximately 0.332" (distance h in FIG. 4) which suggests an increase an arc length of 1.92" and an approximate strain of 9% based on comparison of the geometrically calculated segment length to the diameter. The downstream fluid pump and the feed solution pumps were was then started and set to a constant flow rate of 30 ml/min. 720 ml of solids solution was driven through the device producing a clear filtrate compared to the starting solution. The flow rate was constant through the tests. The pressure drop was 0.017 after processing 100 ml of fluid and was the same at the end of the test after 720 ml of fluid were processed.

Example 7

Figure 10:
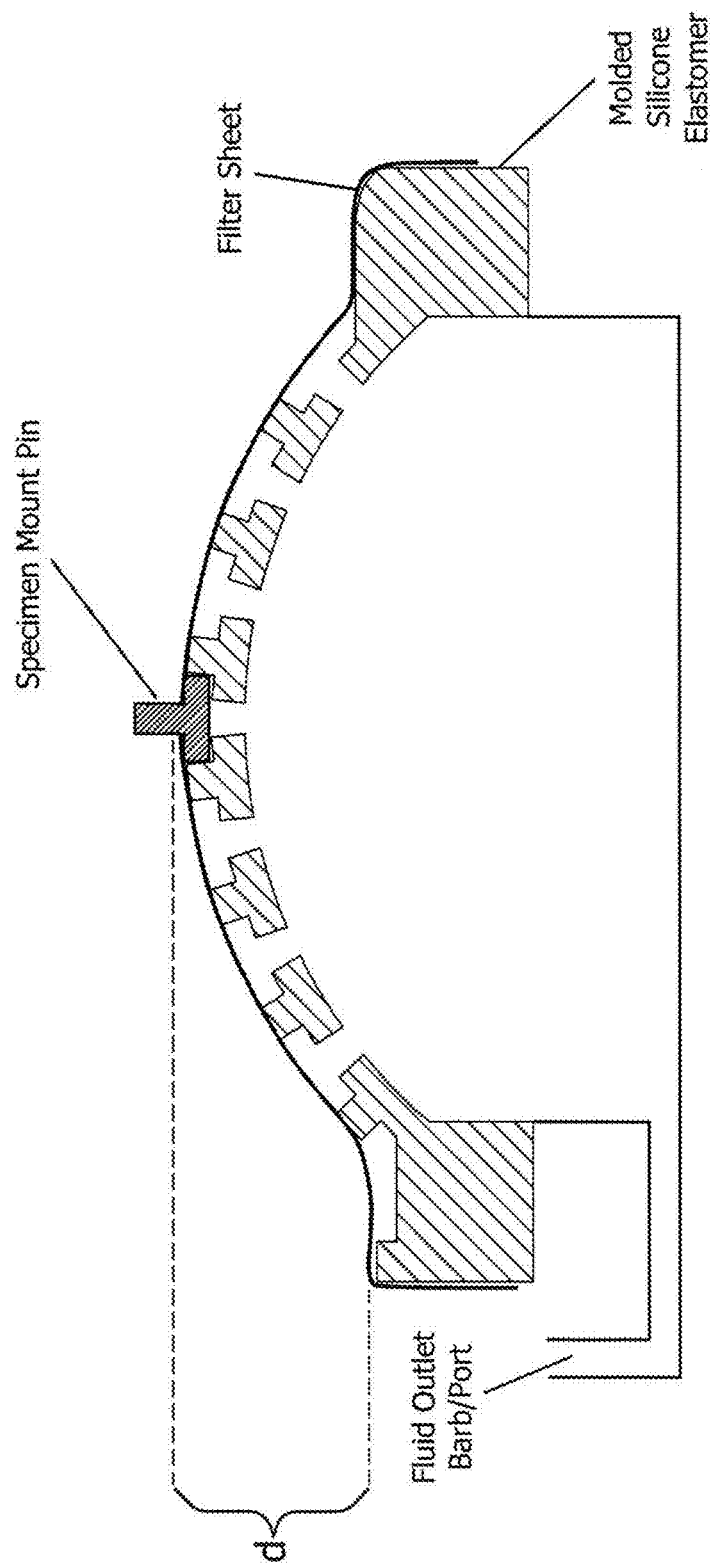
FIG. 10 is a schematic view representing a second exemplary embodiment of the present invention in a ballooned state.

A device of the form described above as the second embodiment was assembled with a hydrophilic monolithic ePTFE membrane and the permeable elastic support with molded perforations. The monolithic hydrophilic ePTFE membrane was H020A090C from Advantec (Advantec MFS, Dublin, Calif.). After attachment to the permeable elastic support with molded perforations the unbonded area of the membrane was measured visually to be about 3.4 in$^2$. The device was mounted in the test apparatus described for second embodiment. The apparatus was then primed with triton water solution to remove air bubbles and fill the downstream side of the membrane with liquid. The bucket was then emptied keeping the downstream of the filter filled with liquid. The bucket was then charged with the 1.5 μm latex particle solution in water. For this X liter was used and the liquid head was 4 inches above the immersed depth of the test sample. The servo driven motor was then set to 60 RPM to create a cyclic up down displacement at a frequency of one hertz (1 cycle per second). The displacement distance d in FIG. 10 was 0.669 inches and the linear speed of the rod was 40 inches/minute. 150 ml of solids solution was driven through the device producing a clear filtrate (turbidity=3.4 NTU) compared to the starting solution (turbidity=48.8 NTU). The rate of mass increase during the test was very slowly decreasing and the calculated Vmax from the equilibrated mass versus time after passing the initial downstream hold up volume (~150 mL) was 10,000 mL (Vmax=Estimated volume processable before complete clogging).

Comparative Example 1

A sample device was assembled prepared and primed exactly as described in example 1. The sample was left in the slack state. The downstream fluid pump and the feed solution pumps were was then started and set to a constant flow rate of 15 ml/min. 720 ml of solids solution was driven through the device producing a clear filtrate compared to the starting solution. The flow rate was constant through the tests. The pressure drop was 0.045 after processing 100 ml of fluid and had increased 0.015 psi to 0.060 by the end of the test after 720 ml of fluid were processed. The pressure trace for this experiment is depicted in FIG. 8.

Comparative Example 2

A sample device was assembled prepared and primed as described in example 1 except that the ePTFE membrane was a two layer composite structure. The composite ePTFE membrane was made by processes described in U.S. Pat. No. 7,306,729. The top surface of the membrane which faced the upstream in the device had smaller pore openings as evidenced by electron microscope images. The membrane had an average matrix tensile strength of 22000 (PSI), an ATEQ airflow of 90 L/h, a bubble point of 25 psi, a porosity of 70%, a thickness of 1.45 mil, mass/area of 11.2 g/m$^2$. The sample was left in the slack state. The downstream fluid pump and the feed solution pumps were was then started and set to a constant flow rate of 30 ml/min. 720 ml of solids solution was driven through the device producing a clear filtrate compared to the starting solution. The flow rate was constant through the tests. The pressure drop was 0.013 after processing 100 ml of fluid and had increased 0.027 psi to 0.040 by the end of the test after 720 ml of fluid were processed.

Comparative Example 3

A sample device was assembled prepared and primed exactly as described in example 7. The sample was left in the slack state as in FIG. 9 and was not moved or disturbed. 150 ml of solids solution was driven through the device producing a clear filtrate (turbidity=3.4 NTU) compared to the starting solution (turbidity=48.8 NTU), The rate of mass increase during the test was decreasing and the calculated Vmax from the equilibrated mass versus time after passing the initial down stream hold up volume (~50 ml) was 400 ml. (Vmax=Estimated volume processable before complete clogging)

Discussion of Example Test Results

Specifically, it has been discovered that a device capable of obtaining a slack and distended state while allowing for continuous forward flow of fluid through the permeable sheet or filter sheet results in significant improvement in performance in separation of solids from a fluid stream.

Figure 7:
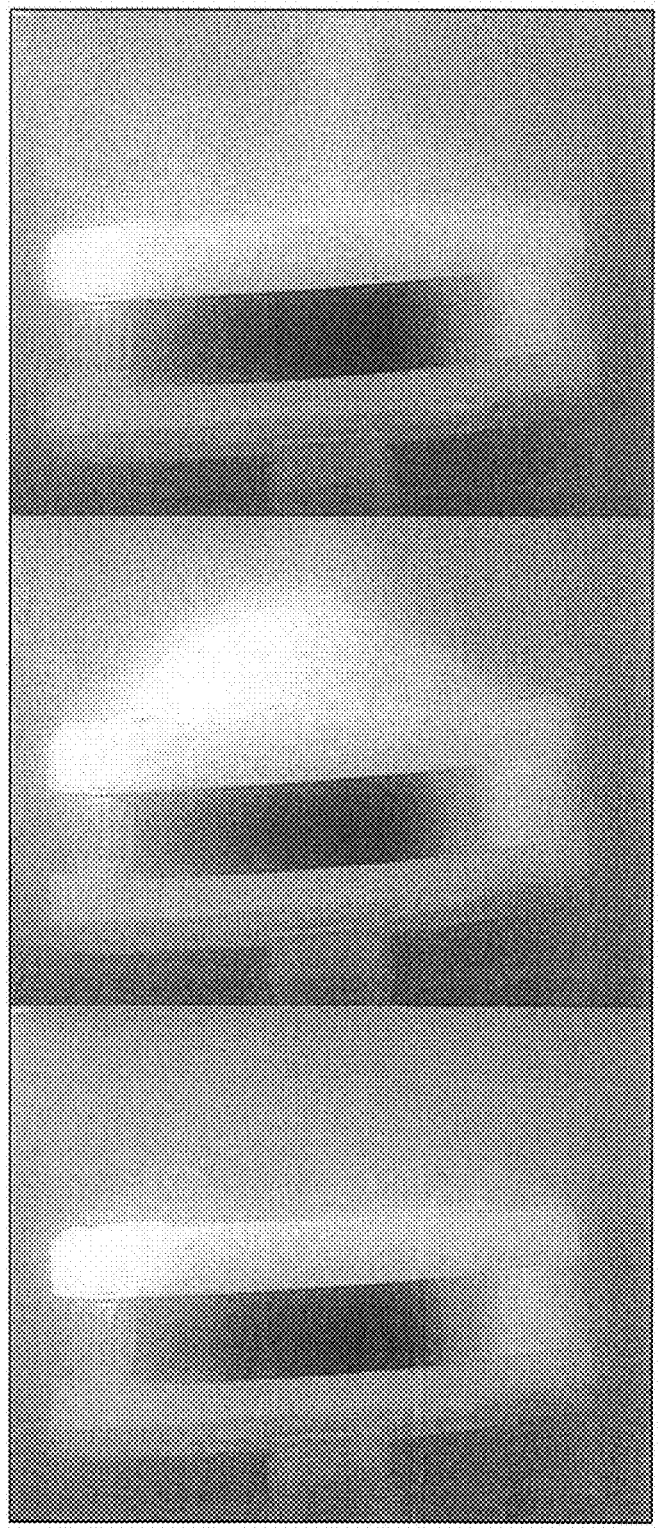
FIG. 7 is a series of photographs of the embodiment in FIG. 1 reduced to practice illustrating ballooned and slack states and the cloud of solids dispersed after transition between states.

This is readily evident visually in the photographs of the first embodiment in FIG. 7 wherein the suspended test particles can be seen being ejected as a cloudy region from the filter surface. This is further illustrated in FIG. 6 in which the pressure trace for example 1 and comparative example 2 are shown. The pressure trace of example 1 remains constant when the filtered is continuously transitioned between the distended and slack states during filtration. In contrast the pressure trace of comparative example one rises appreciably as particles accumulate and clog the membrane. Table 1 further illustrates the advantages of the inventive method and device. Herein it can be seen that the pressure increase of comparative example one after the test is 0.015 psi where as there is no pressure increase for the inventive filter device and method.

In addition examples 2-5 and comparative example 2 use a different membrane structure but observe the same behavior. Specifically it is seen that pressure increases for a static non-moving device, but shows little or no increase when the device is continuously transitioned between states during fluid flow from the up to down stream.

Further more it can be seen that increasing the inflation pressure (and the extent of distention) or increasing the frequency of switching between states improves performance. Here this is seen comparing the example 2 to the preceding examples 3 and 4 which are operated at greater inflation pressure or switching frequency. Furthermore it is seen that increasing both inflation pressure and switching frequency produced the best result. Specifically it resulted in no increase in pressure over the test and also a lower operating pressure than in previous examples.

Example 6 and comparative example 2 further serve to illustrate the advantage of the device and method here enabled in a second embodiment. Mass increase over time slowed down faster for the comparative example 3 relative to example 6 where the filter medium is switched between states. FIG. 13 shows the traditional t/V versus t plot used for Vmax analysis. Here the calculated intercept of the line is the Vmax or extrapolated maximum process volume required to clog the filter. For this analysis data are plotted

| Test | Membrane | Driving Force | Support | Frequency of Switching/ (Cycles Minute) | Plenum Set Pressure (PSI) | Increase in Pressure (%) | Pressure after 100 ml (PSI) | Pressure after 720 ml (PSI) | Vmax (mL) |
|---|---|---|---|---|---|---|---|---|---|
| Example 1 | ePTFE Monolith | Pnuematic | Structured 3D Solid | 141 | 1 | 0 | 0.038 | 0.038 | NA |
| Comparative Example 1 | ePTFE Monolith | None | Structured 3D Solid | 0 | none | 33% | 0.045 | 0.06 | NA |
| Example 2 | ePTFE Assymetric | Pnuematic | Structured 3D Solid | 141 | 0.75 | 20% | 0.02 | 0.024 | NA |
| Example 3 | ePTFE Assymetric | Pnuematic | Structured 3D Solid | 247 | 0.75 | 0 | 0.02 | 0.02 | NA |
| Example 4 | ePTFE Assymetric | Pnuematic | Structured 3D Solid | 141 | 1 | 0 | 0.02 | 0.02 | NA |
| Example 6 | ePTFE Assymetric | Pnuematic | Structured 3D Solid | 247 | 1 | 0 | 0.017 | 0.017 | NA |
| Comparative Example 2 | ePTFE Assymetric | None | Structured 3D Solid | 0 | none | 108% | 0.013 | 0.027 | NA |
| Example 6 | ePTFE Monolith | Mechanical | Permeable Structured 3D Solid | 60 | NA | NA | NA | NA | 10,000 |
| Comparative Example 3 | ePTFE Monolith | None | Permeable Structured 3D Solid | 0 | NA | NA | NA | NA | 400 |

Examples 1-7 and comparative examples 1-3 are summarized in table 1. These examples highlight the performance benefits of the device and method of the instant invention, for flow starting after 40 minutes (to exclude mass flow related to the approximately 50 ml of the initial unfiltered hold up volume in the filter left over from priming the system with latex free triton x100 water solution) Table 1 compares the Vmax value for tests with switching between states (example 6) Vmax=10,000 and without switching states (comparative example 3) Vmax=400. This clearly shows that the expected process volume has increased 25 fold in the inventive example 6 where the states are switched over comparative example 3 where the states are not switched. This embodiment also illustrates the generality of the device and method beyond solid impermeable supports and pneumatic actuation described in examples 1-5, which is instead enabled here in example 6 by direct mechanical actuation on a permeable support sheet. Furthermore the examples shows that switching states even at this lower rate produces the novel significant Improvement in filter performance.

Due to the large hole size of the support used in the second embodiment here (0.09 inches or 2286 microns) it provides no selectivity or separation for the 1.5 micron particles. Thus further illustrating the novelty and utility of the instant invention in that it can not be accomplished by the elastic support alone. Thus demonstrating the permeable sheet attached to the elastic support is necessary to enable the invention. Seen here deforming the elastic support also necessarily causes expansion of its through passages which may be detrimental to separations using such a support alone even for much larger particles.

The invention claimed is:

1. A method of cleaning a filter medium in a flow path of a fluid containing a suspended component, wherein said flow path of said fluid is from a high pressure side of said filter medium to a low pressure side of said filter medium, said method comprising the steps of:
    (a) obtaining an apparatus comprising a filter medium and an elastomer support and attaching said filter medium to elastomer support at several discrete points at a distended state in which the geometrical area of the support is increased under a load between 10% and 1000% so that the filter medium and the elastomer support are both configured to have a first slack state and a second ballooned state, wherein when the elastomer support is in the first slack state, the filter medium is in the first slack state, and wherein when the elastomer support is in the second ballooned state, the filter medium is in the second ballooned state;
    (b) disposing said filter medium in said flow path of said fluid to separate said suspended component from said fluid;
    (c) repeatedly displacing the elastomer support between the first slack state and the second ballooned state thereby repeatedly displacing said filter medium between said first slack state and said second ballooned state and thereby discharging said suspended component from said filter medium during the course of filtration while allowing said fluid to flow continuously through said filter medium from said high pressure side to said low pressure side.

2. A method as described in claim 1 wherein said filter medium is displaced between said first slack state and said second ballooned state one hundred to three hundred times per minute.

3. A method as described in claim 1 wherein said filter medium is substantially planar in shape.

4. A method as described in claim 1 wherein said filter medium is substantially tubular in shape.

5. A method as described in claim 1 wherein said filter medium is asymmetric.

6. A method as defined in claim 1 wherein said second ballooned state is out-of-plane with respect to said first slack state.

7. The method of claim 1 wherein said filter medium is attached to said elastomer support in said ballooned state.

8. A method as described in claim 1 wherein said elastomer support comprises an array of molded posts and said filter medium is attached to said posts by the use of an adhesive.

9. A method as described in claim 1, wherein said filter medium is an expanded polytetrafluoroethylene membrane.

10. A method as described in claim 9, wherein said filter medium has a tensile strength ($T_{medium}$) of: $T_{medium} > E_{support} (A_{ballooned}/A_{slack})$,
    wherein:
        $E_{support}$ is an elastic modulus of said support,
        $A_{ballooned}$ is a geometric area of said filter medium in said ballooned state, and
        $A_{slack}$ is a geometric area of said filter medium in said slack state.

11. An apparatus comprising:
    (a) a filter medium and an elastomeric support both having a first slack state and a second ballooned state;
    (b) wherein the elastomer support is attached to said medium to define a contiguous fluid flow path through said filter medium and said support,
        wherein said filter medium is attached to said elastomer support at several discrete points at a distended state in which the geometrical area of the support is increased under a load between 10% and 1000%;
    (c) wherein the elastomer support is configured to displace said filter medium repeatedly between said first slack state and said second ballooned state, such that when the elastomer support is in the first slack state, the filter medium is in the first slack state, and wherein when the elastomer support is in the second ballooned state, the filter medium is in the second ballooned state,
        wherein the repeated displacement of the elastomer support and the filter medium between the first slack state and the second balloon state is configured to discharge a suspended component from the filter medium during the course of filtration while fluid is configured to flow continuously through said filter medium from said high pressure side to said low pressure side;
        wherein said second ballooned state is out-of-plane with respect to said first slack state; and
    (d) wherein said first slack state of said filter medium provides for areal strain greater than about 10% of said ballooned state.

12. An apparatus as described in claim 11 wherein said filter medium is substantially planar in shape.

13. An apparatus as described in claim 11 wherein said filter medium is substantially tubular in shape.

14. An apparatus as described in claim 11 wherein said filter medium is asymmetric.

15. An apparatus as described in claim 11 in a tubular form.

16. A double diaphragm pump comprising the apparatus of claim 11 wherein said double diaphragm pump provides force for driving flow of fluid and force for displacing said filter medium between said first slack state and said second ballooned state.

17. An apparatus as described in claim 11 wherein said filter medium is attached to said elastomer support in said ballooned state.

18. An apparatus as described in claim 11 wherein said elastomer support comprises an array of molded posts and said filter medium is attached to said posts by the use of an adhesive.

19. An apparatus as described in claim 11, wherein said filter medium is an expanded polytetrafluoroethylene membrane.

20. An apparatus as described in claim 19, wherein said filter medium has a tensile strength ($T_{medium}$) Of:
$T_{medium} > E_{support}(A_{ballooned}/A_{slack})$,
   wherein:
   $E_{support}$ is an elastic modulus of said support,
   $A_{ballooned}$ is a geometric area of said filter medium in said ballooned state, and
   $A_{slack}$ is a geometric area of said filter medium in said slack state.

\* \* \* \* \*